(12) United States Patent
Katsman et al.

(10) Patent No.: US 10,334,437 B2
(45) Date of Patent: Jun. 25, 2019

(54) SECURE PAIRING OF DEVICES AND SECURE KEEP-ALIVE

(71) Applicant: Canary Connect, Inc., New York, NY (US)

(72) Inventors: Andrey Katsman, Ossining, NY (US); Byron Schiel, South Orange, NJ (US); Jean Michel Amblat, Astoria, NY (US); Andrew Martin, Brooklyn, NY (US); Rajendra Kumar Umadas, Queens, NY (US)

(73) Assignee: Canary Connect, Inc., New York, NY (US)

( * ) Notice: Subject to any disclaimer, the term of this patent is extended or adjusted under 35 U.S.C. 154(b) by 171 days.

(21) Appl. No.: 15/618,688

(22) Filed: Jun. 9, 2017

(65) Prior Publication Data

US 2017/0359724 A1 Dec. 14, 2017

Related U.S. Application Data

(60) Provisional application No. 62/347,665, filed on Jun. 9, 2016.

(51) Int. Cl.
*H04L 9/00* (2006.01)
*H04W 12/06* (2009.01)
(Continued)

(52) U.S. Cl.
CPC ........... *H04W 12/06* (2013.01); *H04L 9/0825* (2013.01); *H04L 63/06* (2013.01); *H04L 63/083* (2013.01); *H04L 63/0876* (2013.01); *H04W 12/04* (2013.01); *H04W 76/11* (2018.02); *H04L 67/10* (2013.01); *H04L 2209/80* (2013.01); *H04W 84/12* (2013.01)

(58) Field of Classification Search
CPC ..... H04W 12/04; H04W 12/06; H04W 76/11; H04W 84/12; H04L 63/06; H04L 63/083; H04L 63/0876
See application file for complete search history.

(56) References Cited

U.S. PATENT DOCUMENTS

D469,793 S 2/2003 Onoda
D480,741 S 10/2003 Berger
(Continued)

*Primary Examiner* — Beemnet W Dada
(74) *Attorney, Agent, or Firm* — Sheehan Phinney Bass & Green PA

(57) ABSTRACT

A method includes sending identification information for a mobile hotspot device from that device to a cloud-based computer processing system, sending identification information for a security monitoring device from that device to an app on a user's mobile device, prompting the user, via the app, to provide the identification information for the mobile hotspot device to the user's mobile device, and sending a pairing request from the app to the cloud-based computer processing system. The pairing request includes the identification information for the mobile hotspot device that was provided by the user and the identification information for the security monitoring device. The method further includes sending a response to the pairing request from the cloud-based computer processing system to the app, and using information in the response to establish a wireless connection between the mobile hotspot device and the security monitoring device.

20 Claims, 17 Drawing Sheets

(51) Int. Cl.
*H04L 29/06* (2006.01)
*H04W 12/04* (2009.01)
*H04W 76/11* (2018.01)
*H04L 9/08* (2006.01)
*H04W 84/12* (2009.01)
*H04L 29/08* (2006.01)

(56) References Cited

U.S. PATENT DOCUMENTS

| | | |
|---|---|---|
| D534,938 S | 1/2007 | Beasley |
| D540,359 S | 4/2007 | Renkis |
| D730,421 S | 5/2015 | Huang |
| D733,207 S | 6/2015 | Thomas |
| 9,078,137 B1 * | 7/2015 | Chechani .............. H04W 12/08 |
| D736,292 S | 8/2015 | Fengmin |
| D741,932 S | 10/2015 | Huang |
| D747,383 S | 1/2016 | Li |
| D754,234 S | 4/2016 | Lee |
| D764,559 S | 8/2016 | Luo |
| D777,234 S | 1/2017 | Webb |
| 9,992,649 B1 * | 6/2018 | Govindassamy ..... H04W 76/10 |
| 10,045,216 B1 * | 8/2018 | Indurkar .............. H04W 12/06 |
| 10,079,689 B2 * | 9/2018 | Yi ........................... H04L 67/16 |
| 10,158,995 B2 * | 12/2018 | Hillier ................... H04W 12/08 |
| 2014/0160349 A1 | 6/2014 | Huang |

* cited by examiner

SECURE PAIRING OF DEVICES AND SECURE KEEP-ALIVE

CROSS-REFERENCE TO RELATED APPLICATION(S)

This application claims the benefit of priority to U.S. Provisional Patent Application No. 62/347,665, entitled, Secure Pairing of Devices, which was filed on Jun. 9, 2016. The disclosure of the prior application is incorporated by reference herein in its entirety.

FIELD OF THE INVENTION

This disclosure relates to a method of (and a system configured to facilitate) securely pairing devices, such as but not limited to a security monitoring device and a mobile hotspot device, to each other. This disclosure also relates to a security monitoring system and, more particularly, relates to techniques and systems to securely maintain a wireless connection in the security monitoring system.

BACKGROUND

In many ways, modern society relies on devices being able to wirelessly communicate with one another.

The concept of wireless communication relates generally to the transfer of information between two or more points that are not connected by an electrical conductor. Long Term Evolution (LTE), Wi-Fi and Bluetooth® technologies are some examples of modern wireless technologies.

Generally speaking, two devices must be paired together (e.g., linked together) to allow communications between them.

SUMMARY OF THE INVENTION

This section of the Summary relates to techniques and systems to securely maintain a wireless connection in the security monitoring system.

In one aspect, a method of (and a system configured to facilitate) securely pairing devices (such as, but not limited to, a security monitoring device and a mobile hotspot device) to each other is disclosed.

One particular implementation includes sending identification information for a mobile hotspot device from that device to a cloud-based computer processing system, sending identification information for a security monitoring device from that device to an app on a user's mobile device, prompting the user, via the app, to provide the identification information for the mobile hotspot device to the user's mobile device, and sending a pairing request from the app to the cloud-based computer processing system. The pairing request includes the identification information for the mobile hotspot device that was provided by the user and the identification information for the security monitoring device. The method further includes sending a response to the pairing request from the cloud-based computer processing system to the app, and using information in the response to establish a wireless connection between the mobile hotspot device and the security monitoring device.

This method, and other methods disclosed herein, relates generally to pairing a first device (e.g., a mobile hotspot device) to a second device (e.g., a security monitoring device) so that the two devices can work together within a particular technical environment. In this regard, the concept of pairing generally relates to the linking together of devices to allow communications between them.

In another aspect, a system includes a first device (e.g., a mobile hotspot device), a second device (e.g., a security monitoring device), a cloud-based computer-processing system; a user's mobile device; and a software application on the user's mobile device. According to this aspect, the system is operable to pair the first device to the second device to establish a communication channel there between by: sending information that includes identification information for the first device from the first device to the cloud-based computer processing system, sending identification information for a second device from the second device to a software application on a user's mobile device, prompting a user, via the software application on the user's mobile device, to provide the identification information for the first device to the user's mobile device, and sending a pairing request from the software application on the user's mobile device to the cloud-based computer processing system. The pairing request includes the identification information for the first device that was provided by the user and the identification information for the second device. The pairing technique further includes sending a response to the pairing request from the cloud-based computer processing system to the software application on the user's mobile device, and using information in the response to the pairing request to establish a wireless connection between the first device and the second device.

In some implementations, the first device is equipped with Wi-Fi and cellular communication capabilities, and the second device is equipped with Wi-Fi communication capabilities, but not cellular communication capabilities. Moreover, in some implementations, the first device is a mobile hotspot device and the second device is a security monitoring device.

The security monitoring device may include: a housing; a camera supported by the housing, wherein the camera is operable to obtain images or video clips of a monitored physical location; and one or more computer chips supported by the housing. The security monitoring device (e.g., the one or more computer chips) may be configured to support: wireless communications based on a wireless protocol for exchanging data over short distances from the security monitoring device to fixed or mobile devices; and wireless communications based on Wi-Fi.

In yet another aspect, a method includes: sending information that includes identification information for a first device from the first device to a cloud-based computer processing system, sending identification information for a second device from the second device to a software application on a user's mobile device, prompting a user, via the software application on the user's mobile device, to provide the identification information for the first device to the user's mobile device, and sending a pairing request from the software application on the user's mobile device to the cloud-based computer processing system. The pairing request includes the identification information for the first device that was provided by the user and the identification information for the second device. The method also includes sending a response to the pairing request from the cloud-based computer processing system to the software application on the user's mobile device, and using information in the response to the pairing request to establish a wireless connection between the first device and the second device.

In some implementations, the method further includes: prompting a user (e.g., a human user), via the software application on the user's mobile device, to provide the identification information for the first device to the user's mobile device. The identification information for the first device in the pairing request may be or include the identification information for the first device provided by the user in response to the prompt.

In some implementations, the first device is equipped with Wi-Fi and cellular communication capabilities, and the second device is equipped with Wi-Fi communication capabilities, but not with cellular communication capabilities.

In certain implementations, after the wireless connection is established between the first device and the second device, the second device communicates with the cloud-based computer processing system and/or the software application on the user's mobile device through the first device.

In still another aspect, a method includes: receiving, at a cloud-based computer processing system, a pairing request from a software application on a user's mobile device, wherein the pairing request includes identification information for the first device that was provided by the user at the mobile device and identification information for a second device, and sending a response to the pairing request from the cloud-based computer processing system to the software application on the user's mobile device. Information in the response to the pairing request is used to establish a wireless connection between the first device and the second device.

In some implementations, the first device is equipped with Wi-Fi and cellular communication capabilities, and the second device is equipped with Wi-Fi communication capabilities, but not with cellular communication capabilities.

In some implementations, after the wireless connection is established between the first device and the second device, the second device is able to communicate with the cloud-based computer processing system and/or the software application on the user's mobile device through the first device.

The first device may be a mobile hotspot device and the second device may be a security monitoring device.

Still another aspect includes a system with a user's mobile device, and a cloud-based computer-processing system. The cloud-based computer-processing system is configured to: receive a pairing request from a software application on the user's mobile device (the pairing request includes identification information for a first device that was provided by the user at the mobile device and identification information for a second device), and send a response to the pairing request to the software application on the user's mobile device. Information in the response to the pairing request is used to establish a wireless connection between the first device and the second device.

In some implementations, the first device is equipped with Wi-Fi and cellular communication capabilities, and the second device is equipped with Wi-Fi communication capabilities, but not with cellular communication capabilities.

In some implementations, after the wireless connection is established between the first device and the second device, the second device is able to communicate with the cloud-based computer processing system and/or the software application on the user's mobile device through the first device.

The first device may be a mobile hotspot device and the second device may be a security monitoring device.

In some implementations, one or more of the following advantages are present.

A convenient, efficient, easy to implement and secure method of pairing two devices can be realized. In some implementations, these devices may be part of a security monitoring system, for example. In this regard, the concept of security or security monitoring should be construed broadly as relating to virtually any kind of security, safety, or similar concepts—of which a home owner, renter, business owner, etc. may wish to have monitored.

The following section of the summary relates to secure keep-alive techniques and systems to securely maintain a wireless connection in the security monitoring system.

In one such aspect, a method that can be implemented in a security system that includes a device to monitor security at a location and a processing system coupled to the device. The method includes generating a seed and a nonce for sharing between the device and the security processing system over a secured connection when the security monitoring device is active. The method includes generating a first series of bit sequences using a pseudo-random algorithm with the seed used to initialize the algorithm, dividing the nonce into bit blocks, generating a payload by logically combining the bit blocks with the bit sequences in a bitwise manner, and sending a keep-alive message with the first payload from the device to the processing system when the device is in sleep mode and the wireless connection is not using a secure channel.

In a typical implementation, the seed and the nonce are random.

In some implementations, the method further includes: generating a second series of bit sequences using the pseudo-random number generating algorithm using a last bit sequence from the first series as a seed to initialize the pseudo-random number generating algorithm to generate the second series; generating a second payload by logically combining each one of the bit blocks with a respective one of the bit sequences in the second series in a bitwise manner; and sending a second keep-alive message that is or includes the second payload from the security monitoring device to the security processing system when the security monitoring device is in the sleep mode and the wireless connection is not secured.

In a typical implementation, the second payload is different than the first payload.

In some implementations, the security monitoring device generates the first series of bit sequences, divides the nonce into the plurality of bit blocks, and generates the first payload when the security monitoring device is in the sleep mode and the wireless connection is not secured.

According to certain implementations, the method further includes: receiving the first keep-alive message at the security processing system; and confirming that the first keep-alive message originated at the security monitoring device in the sleep mode. The security processing system may confirm that the first keep-alive message originated at the security monitoring device in the sleep mode by: generating a series of test bit sequences using the pseudo-random number generating algorithm with the seed being used to initialize the pseudo-random number generating algorithm; dividing the nonce into a plurality of test bit blocks; generating a test payload by logically combining each one of the test bit blocks with a respective one of the test bit sequences in the series in a bitwise manner; and comparing the test payload with the first payload received in the first keep-alive message.

In certain implementations, the security processing system generates the seed and the nonce, and the method further includes: transmitting the seed and the nonce from the security processing system to the security monitoring device over the wireless connection while the security monitoring device is in the active mode and the wireless connection is secured. In some such implementations, the method includes receiving the seed and the nonce at the security monitoring device, and the security monitoring device, after receiving the transmitted seed and nonce, retransmits the seed and the nonce back to the security processing system over the wireless connection while the security monitoring device is in the active mode and the wireless connection is secured to confirm having properly received the seed and the nonce.

In some implementations, the method further includes: securing the wireless connection between the security monitoring device and the security processing system when the security monitoring device is in the active mode with transport layer security (TLS). The transport layer security (TLS) may not secure the wireless connection when the security monitoring device is in the sleep mode.

According to certain implementations, logically combining each one of the bit blocks with a respective one of the bit sequences in the first series uses one or more bitwise operations.

In certain implementations, the security monitoring device has a housing, a camera coupled to the housing, a motion sensor coupled to the housing, a main computer-based processor coupled to the housing, and a Wi-Fi module coupled to the housing. Moreover, in some such implementations, the security monitoring device is in the active mode when the camera and the main computer-based processor are operational and/or when the security monitoring device is transmitting images or video from the camera to the security processing system. Moreover, in some such implementations, the security monitoring device is in the sleep mode when the camera and the main computer-based processor are inactive and the security monitoring device is not transmitting images or video from the camera to the security processing system. According to some implementations, the motion sensor and the Wi-Fi module are operational when the security monitoring device is in the sleep mode. Moreover, in some implementations, the method includes toggling from the sleep mode to the active mode at the security monitoring device in response to a trigger from either the motion sensor or from the security processing system.

In a typical implementation, the security monitoring system is hubless, such that each keep-alive message travels from the security monitoring device to the security processing system via the network without passing through a local network interim processing station (hub), for example.

In some implementations, the method further includes: generating a new seed and a new nonce to share between the security monitoring device and the security processing system over the wireless connection after the security monitoring has reentered the active mode after having been in the sleep mode. The new seed and the new nonce may be different than the (previous) seed and nonce.

According to certain implementations, the security monitoring system further includes one or more mobile user devices, and the method further includes: communicating information between the one or more mobile devices and either the security monitoring device, the security processing system, or both via the network.

Applying the pseudo-random number generating algorithm may, in some implementations, result in predictable payload mutation.

In yet another aspect, a security monitoring system includes: a security monitoring device configured to monitor security at a monitored physical location, and a security processing system coupled to the security monitoring device via a network. The security monitoring system is configured to generate a seed and a nonce to share between the security monitoring device and the security processing system over a wireless connection across the network when the security monitoring device is in an active mode and the wireless connection is secured. The security monitoring device is configured to: generate a first series of bit sequences using a pseudo-random number generating algorithm with the seed being used to initialize the pseudo-random number generating algorithm; divide the nonce into a plurality of bit blocks; generate a first payload by logically combining each one of the bit blocks with a respective one of the bit sequences in the first series in a bitwise manner; and send a first keep-alive message that is or includes the first payload to the security processing system when the security monitoring device is in a sleep mode and the wireless connection is not secured.

In certain implementations, the security monitoring device is further configured to: generate a second series of bit sequences using the pseudo-random number generating algorithm with a last bit sequence from the first series as a seed to initialize the pseudo-random number generating algorithm to generate the second series; generate a second payload by logically combining each one of the bit blocks with a respective one of the bit sequences in the second series in a bitwise manner; and send a second keep-alive message that is or includes the second payload to the security processing system when the security monitoring device is in the sleep mode and the wireless connection is not secured. The second payload may be different than the first payload.

In some implementations, the security monitoring device is further configured to generate the first series of bit sequences, divide the nonce into the plurality of bit blocks, and generate the first payload when the security monitoring device is in the sleep mode and the wireless connection is not secured. Moreover, in some implementations, the security processing system is further configured to: receive the transmitted first keep-alive message; and confirm that the first keep-alive message originated at the security monitoring device in the sleep mode. Moreover, in some implementations, the security processing system is further configured to confirm that the first keep-alive message originated at the security monitoring device in the sleep mode by: generating a series of test bit sequences using the pseudo-random number generating algorithm with the seed being used to initialize the pseudo-random number generating algorithm; dividing the nonce into a plurality of test bit blocks; generating a test payload by logically combining each one of the test bit blocks with a respective one of the test bit sequences in the series in a bitwise manner; and comparing the test payload with the first payload received in the first keep-alive message.

The security processing system may be further configured to generate the seed and the nonce. Moreover, the security processing system may be configured to transmit the seed and the nonce to the security monitoring device over the wireless connection while the security monitoring device is in the active mode and the wireless connection is secured. The securing monitoring device is, in some implementations, further configured to: receive the seed and the nonce at the security monitoring device; and after receiving the seed and nonce, retransmit the seed and the nonce back to the security processing system over the wireless connection while in the active mode and while the wireless connection is secured to confirm having properly received the seed and the nonce.

In some implementations, the wireless connection between the security monitoring device and the security processing system is secured by transport layer security (TLS) when the security monitoring device is in the active mode. Moreover, the transport layer security (TLS) typically does not secure the wireless connection when the security monitoring device is in the sleep mode.

According to some implementations, logically combining each one of the bit blocks with a respective one of the bit sequences in the first series is done using one or more bitwise operations.

In certain implementations, the security monitoring device has: a housing; a camera coupled to the housing; a motion sensor coupled to the housing; a main computer-based processor coupled to the housing; and a Wi-Fi module coupled to the housing. In some such implementations, the security monitoring device is in the active mode when the camera and the main computer-based processor are operational and/or when the security monitoring device is transmitting images or video from the camera to the security processing system. Moreover, in some such implementations, the security monitoring device is in the sleep mode when the camera and the main computer-based processor are inactive and the security monitoring device is not transmitting images or video from the camera to the security processing system.

In some implementations, the motion sensor and the Wi-Fi module are operational when the security monitoring device is in the sleep mode.

In some implementations, the security monitoring device is further configured to toggle from the sleep mode to the active mode in response to a trigger from either the motion sensor or from the security processing system.

In a typical implementation, the security monitoring system is hubless, such that each keep-alive message travels from the security monitoring device to the security processing system via the network without passing through a local network interim processing station (hub), for example.

In certain implementations, the security monitoring system is further configured to: generate a new seed and a new nonce to share between the security monitoring device and the security processing system over the wireless connection after the security monitoring has reentered the active mode after having been in the sleep mode. The new seed and the new nonce may be different than the (previous) seed and nonce.

In some implementations, the security monitoring system further includes: one or more mobile user devices configured to communicate with either the security monitoring device, the security processing system, or both via the network.

In a typical implementation, the seed is a random seed and/or the nonce is a random nonce.

In some implementations, one or more of the following advantages are present.

For example, the systems and techniques disclosed herein can enable a wireless connection between security system components (e.g., a security monitoring device and a remote security processing system) to be maintained even as one of those components toggles between a (high power, high functionality) active mode and a (low power, low functionality) sleep mode. This advantageously avoids complications involved in having to establish new connections between those components and also helps preserve battery life, because establishing new connections over and over requires power. Therefore, in a typical implementation, the systems and advantageously disclosed herein helps preserve battery life (e.g., at a battery-operated security monitoring device 10) and helps to ensure continuity of connection between the security system components.

Moreover, in a typical implementation, these advantages can be realized while maintaining security in the system and on the wireless connection, even as one of the components toggles between active and sleep mode and even when traditional connection security measures (e.g., transport layer security, TLS) are not available on the wireless connection. Generally speaking, when the system or security monitoring device is in sleep mode, certain traditional connection security measures (e.g., TLS) are not available for the wireless connection due to the system or security monitoring device being in a lower capability/lower functionality operating mode.

Other features and advantages will be apparent from the description and drawings, and from the claims.

BRIEF DESCRIPTION OF THE DRAWINGS

There are two sections of drawings in this application. The first section of drawings includes.

DETAILED DESCRIPTION

This section of the detailed description relates to the first section of drawings.

Figure 1:
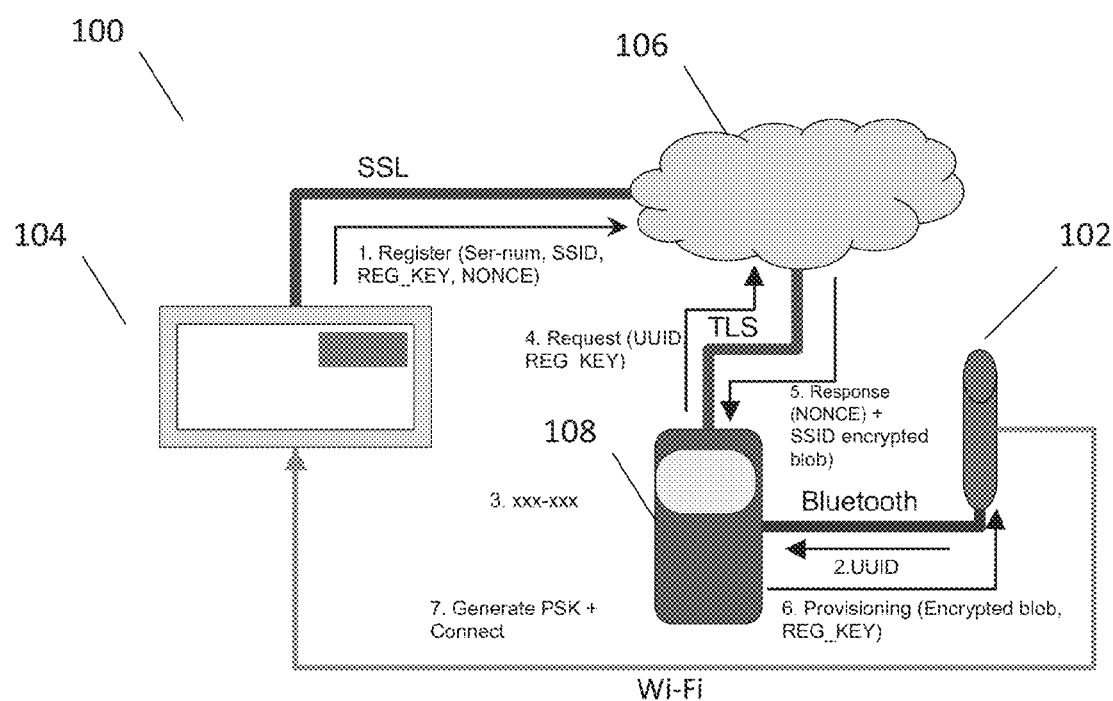
FIG. 1 is a schematic representation of an exemplary security monitoring system.

FIG. 1 is a schematic representation of an exemplary security monitoring system 100.

The illustrated system 100 includes a security monitoring device 102 with a built-in camera, a mobile hotspot device 104, a remote, cloud-based computer processing system 106 and a mobile device 108, such as a smartphone. In a typical implementation, each of these system components 102, 104, 106 and 108 is physically distinct from the other system components, though, as discussed herein, during operation, the monitoring device 102 may be physically coupled to and supported by the mobile hotspot device 104.

In a typical implementation, the security monitoring device 102 is configured to capture data (e.g., images, video, etc.) from the monitored physical space. The security monitoring device 102 may process the captured data and/or transmit the captured data and any processing results (via the mobile hotspot device 104) to the remote, cloud-based computer processing system 106. The mobile hotspot device 104 can be any kind of device that is capable of acting as a wireless access point for the monitoring device 102, through which the monitoring device 102 can communicate with the remote, cloud-based computer processing system 106. The computer processing system 106 may be one or more servers, for example, configured to process and/or store at least some of the data received from the monitoring device 102 (via the mobile hotspot device 104). The computer-based processing system 106 may be further configured to make certain data (e.g., images or video from the monitored physical location) available for viewing at the mobile device 108, for example. If the user happens to view an image or video that shows an intruder breaking into his home, the user will be able to take appropriate action (e.g., call the police department, etc.). Additionally, the mobile device 108 may be configured to enable a user to view certain data and/or to control certain aspects of the system functionality (e.g., turning the monitoring device on or off from a remote location).

Thus, in a typical implementation, the illustrated system components 102, 104, 106 and 108 are configured to work together and to communicate with each other so as to facilitate monitoring of security at the monitored physical space.

In a typical implementation, the monitoring device 102 is configured to support wireless short range wireless communications using Bluetooth® and/or Wi-Fi wireless communication technologies, for example. However, the monitoring device 102 generally is not equipped with cellular communication technology (e.g., 4G LTE or the like) that would allow the monitoring device 102 to communicate directly with the remote, cloud-based computer processing system 106.

Accordingly, in a typical implementation, the monitoring device 102 leverages the mobile hotspot device 104, which does have cellular communication capabilities (e.g., 4G LTE), and serves as a wireless access point for the monitoring device 102, through which communications can be routed from the monitoring device 102 to the cloud-based computer processing system 106. In a typical implementation, the monitoring device 102 has to be paired to the mobile hotspot device 104 so that the indicated functionalities can be realized. The concept of pairing in this regard refers generally to establishing a communication link between the two components and indicating the other system components (e.g., to the remote, cloud-based computer-processing system 106) that the monitoring device 102 and the mobile hotspot device 104 are associated with one another. Pairing is complicated, of course, by the fact that, in a typical implementation, neither the monitoring device 102, nor the mobile hotspot device 104 has any significant user interface (e.g., buttons, keyboard, touchscreen, etc.) that might facilitate programming in this regard.

Of course, since the system 100 is typically operable to handle sensitive information (e.g., images and/or video from a person's home), it is importance that security, in set up and in system operations, be ensured.

Figure 2:
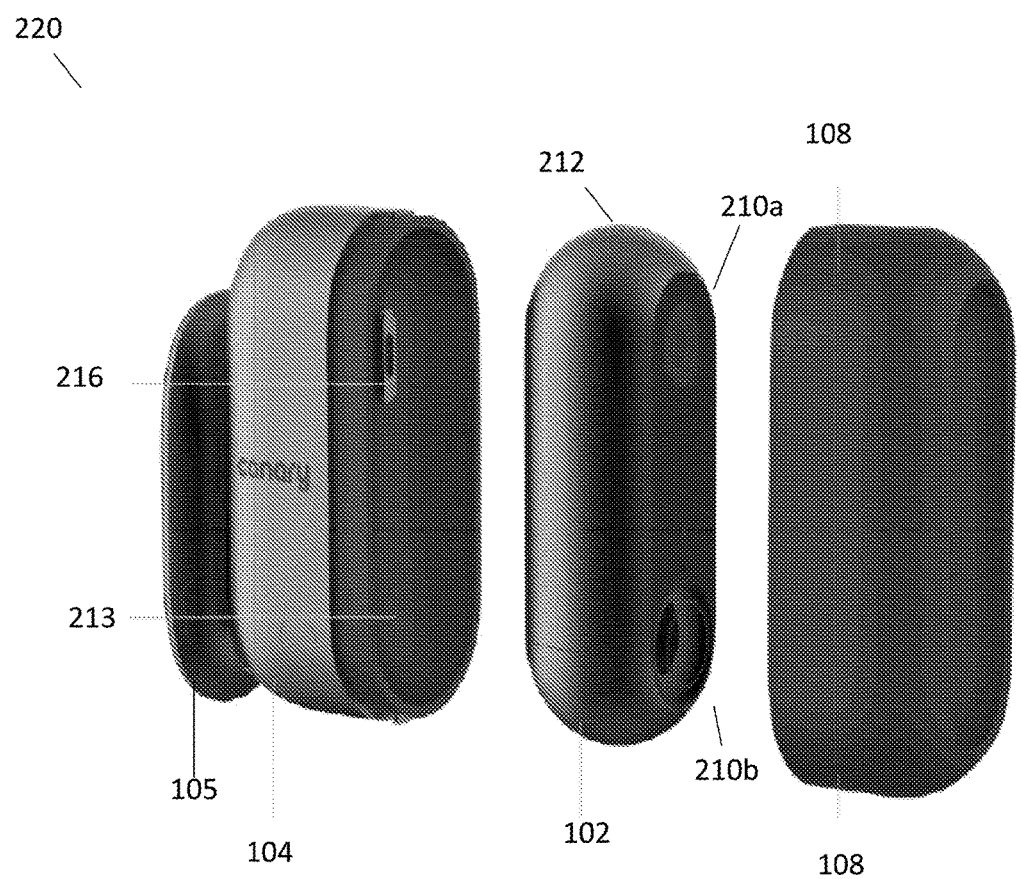
FIG. 2 is an exploded perspective view of an exemplary assembly that includes a security monitoring device, a mobile hotspot device, and a cover.

FIG. 2 is an exploded perspective view of an exemplary assembly 220 that includes a security monitoring device 102, a mobile hotspot device 104, and a cover 108.

The security monitoring device 102, according to the illustrated implementation, has a housing 212 that is substantially oblong and pill-shaped with a flat front surface. There are optical elements exposed at the flat front surface of the housing 212 and an audio element at the top of the housing 212. In a typical implementation, the upper optical element 210a is a camera lens (for an internal camera), the lower optical element 210b is a lens (for an internal motion sensor), and the middle optical element is a lens (for an internal ambient light sensor). In a typical implementation, the audio element at the top of the housing is a speaker.

In a typical implementation, there is a switch (or button), which is not shown in the figures, at rear surface of the security monitoring device 102 opposite the flat front surface. The switch (or button) may be pressed by a user, for example, during system start up to prompt the security monitoring device 102 to take some kind of action. In a typical implementation, this single, simple switch (or button) is the only type of user interface component on the security monitoring device 102.

Generally speaking, the security monitoring device 102 is configured to collect data (e.g., images, video and/or sound) from a monitored physical location (i.e., wherever the security monitoring device 102 ends up being located). In some implementations, the security monitoring device 102 is Bluetooth®-enabled and/or Wi-Fi enabled, but is not cellular-enabled or otherwise able to communicate with a remote, cloud-based computer processing system (e.g., 106 in FIG. 1).

The mobile hotspot device 104 has a housing 214 that is contoured to define a recess for receiving the security monitoring device 102. There is a magnet inside the housing 214 (at position 213 inside the recess) that helps hold the security monitoring device 102 in place against the mobile hotspot device 102 in the recess. An outlet 216 is exposed at a surface of the housing 214 inside the recess. In a typical implementation, the security monitoring device 102 can be connected via a cord to this outlet 216 and can be electrically charged via the resulting connection. In some implementations, the mobile hotspot device 104 has a power cord that can be electrically coupled to an external electric power source.

In a typical implementation, the mobile hotspot device is able to act as a wireless access point (e.g., to the Internet and/or to a remote cloud-based computer system, such as 106 in FIG. 1) for the security monitoring device 102.

The mobile hotspot device 104 also has a base unit 105 that is configured to facilitate attaching the mobile hotspot device and/or the other components of the illustrated implementation to a mounting surface (e.g., a wall of a user's home, a mounting pole, etc.).

The cover 108 is configured to extend over and hold the security monitoring device 102 in place against the mobile hotspot device 104 when it is within the recess. The cover 108 is further configured to securely engage the housing 214 of the mobile hotspot device 104 as well. The cover 108 defines a front opening, through which the optical elements of the security monitoring device 102 are exposed, and a top opening, through which the audio element of the security monitoring device is exposed.

Figure 3A:
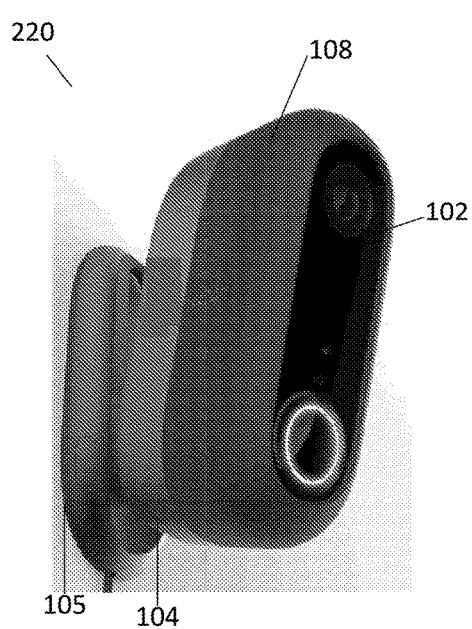
FIGS. 3A and 3B show alternate views of the exemplary assembly from FIG. 2, with its components coupled together and attached to a mounting surface.
Figure 3B:
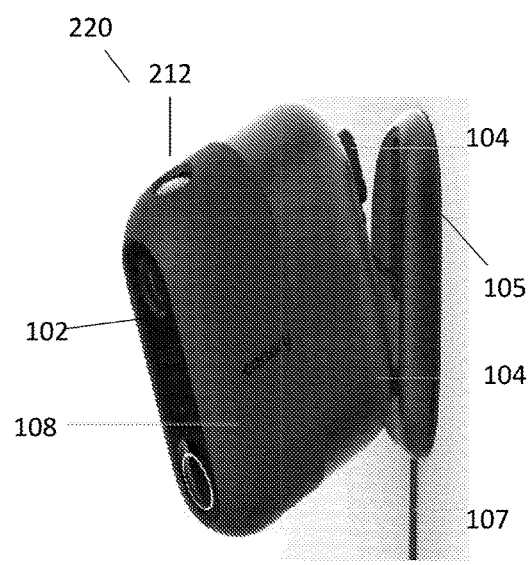

FIGS. 3A and 3B show alternate views of an exemplary assembly 220 that includes a security monitoring device 102, a mobile hotspot device 104, and a cover 108 coupled together and attached to a mounting surface.

As shown, the base unit 105 of the assembly is securely coupled (e.g., with adhesive or a fastening device) to a mounting surface. The sub-assembly that includes the mobile hotspot device 104, the security monitoring device 102 and the cover 108, is secured to, but movable relative to, the base unit 105. Therefore, the angle of viewing for the camera in the security monitoring device 102, for example, can be adjusted over a wide range of possible angles. An electrical power cord 107 is shown extending out of the assembly (i.e., from the bottom of the base unit 105).

In addition to providing a schematic representation of an exemplary system configuration, FIG. 1 also includes high-level details of an exemplary process for securely pairing the security monitoring device 102 to the mobile hotspot device 104. Although the process is represented in FIG. 1 as a series of steps (i.e., 1-7), in practice, the order of certain steps in the process can vary. Moreover, in various implementations, other steps can be added to the process, one or more of the steps can be omitted and/or one or more of the steps may be modified.

First, according to the illustrated implementation, the mobile hotspot device 104 registers with the remote, cloud-based computer processing system 106. This involves sending to the cloud-based computer processing system 106, a serial number for the mobile hotspot device, a service set identifier (SSID), a registry key (REG_KEY) and a nonce. These items are sent over a cellular connection (e.g., 4G LTE) utilizing SSL (i.e., either secure sockets layer (SSL) or transport layer security (TLS)).

Next, according to the illustrated implementation, the security monitoring device 102 sends a universally unique identifier (UUID), utilizing a Bluetooth® connection, to a software application (i.e., "app") on the user's mobile device 108.

Next, according to the illustrated implementation, the user provides the registry key (REG_KEY) to the mobile device 108. There are a variety of ways in which this may be done. In one example, the app on the user's mobile device 108 prompts the user to provide the registry key (REG_KEY). In response, the user can enter the registry key (e.g., by typing the registry key into the mobile device 108, or scanning a bar code or QR code, etc. that represents the registry key) into the mobile device 108.

Next, according to the illustrated implementation, the app on the user's mobile device 108 sends a pairing request to the cloud-based processing system 106 utilizing transport layer security (TLS). The exemplary pairing request includes the UUID (from the security monitoring device 102) and the registry key (REG_KEY) (provided by the user).

Next, according to the illustrated implementation, the cloud-based computer processing system 106 sends a response to the pairing request to the app on the user's mobile device 108 utilizing TLS. The response includes an encrypted blob that includes the SSID and the nonce (i.e., typically the ones that are uploaded for the device with the REG_KEY). In a typical implementation, the blob is encrypted with elliptical curve cryptography (ECC) public key that matches the UUID.

Next, according to the illustrated implementation, the app on the user's mobile device 108 provides the encrypted blob (that includes the SSID and the nonce) and the registry key (REG_KEY) to the security monitoring device 102. According to the illustrated implementation, this information is provided via the Bluetooth® connection between the user's mobile device 108 and the security monitoring device 102.

Finally, according to the illustrated implementation, the security monitoring device 102 generates a pre-shared key (PSK), based on the encrypted blob (that includes the SSID and the nonce) and the registry key (REG_KEY), and uses the PSK to connect, using Wi-Fi, to the mobile hotspot device 104.

In a typical implementation, the foregoing pairing technique(s) represent a secure and substantially tamper-proof method of easily provisioning the security monitoring device onto an access point at the mobile hotspot device 104. These technique(s) require minimal user effort, as well.

Figure 4A:
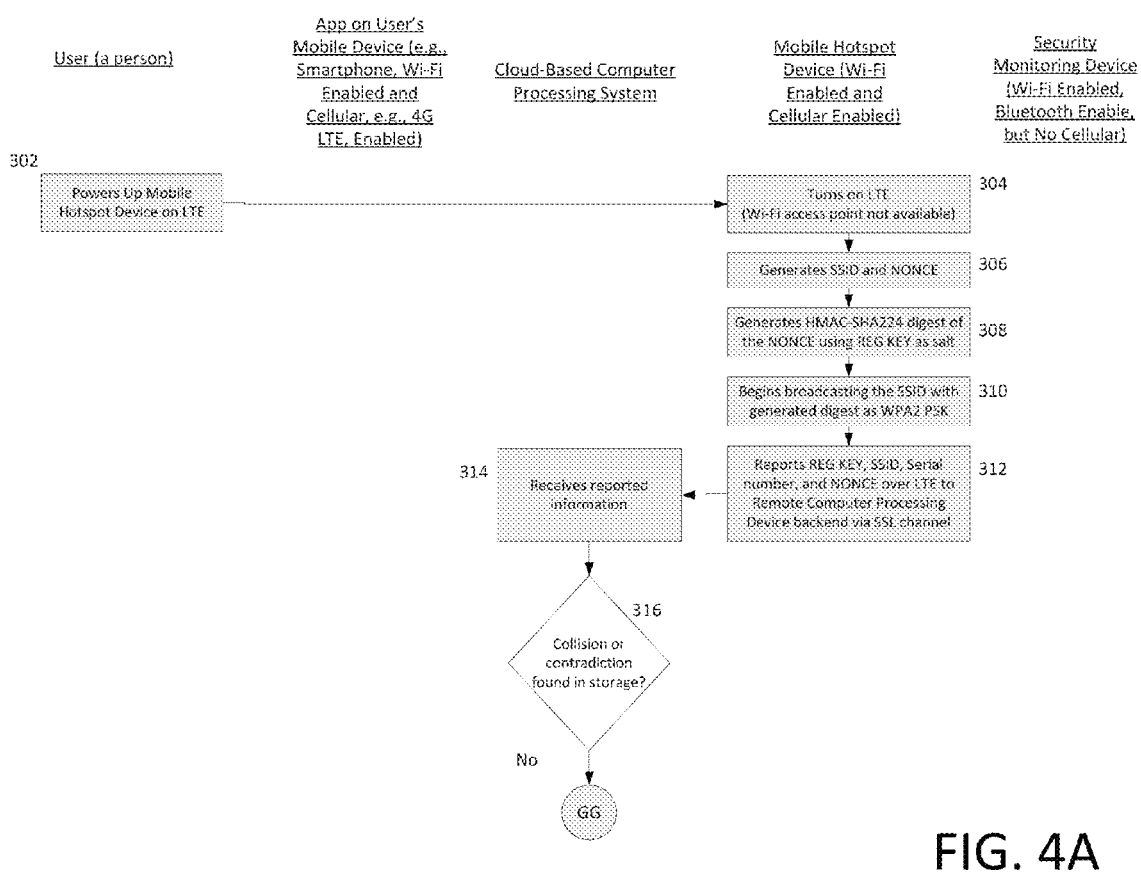
FIGS. 4A-4C show a flowchart that outlines an exemplary implementation of a pairing process.
Figure 4B:
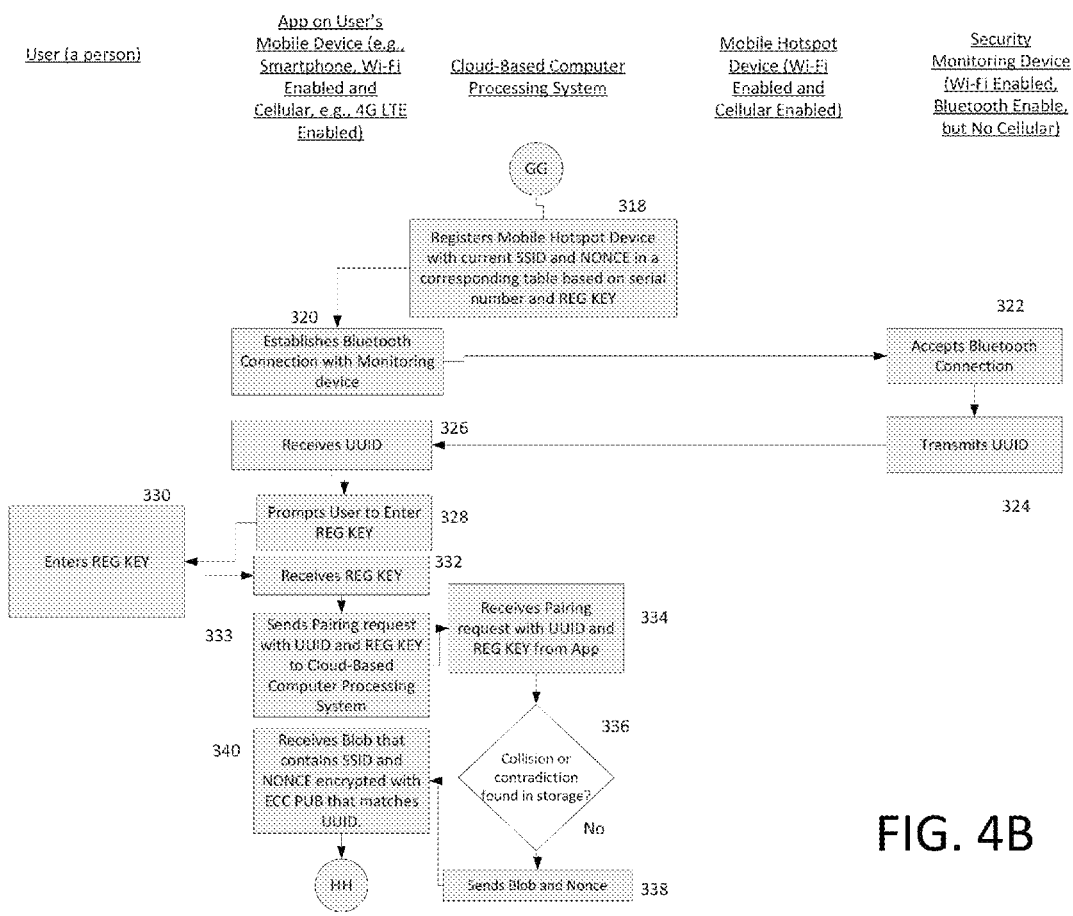
Figure 4C:
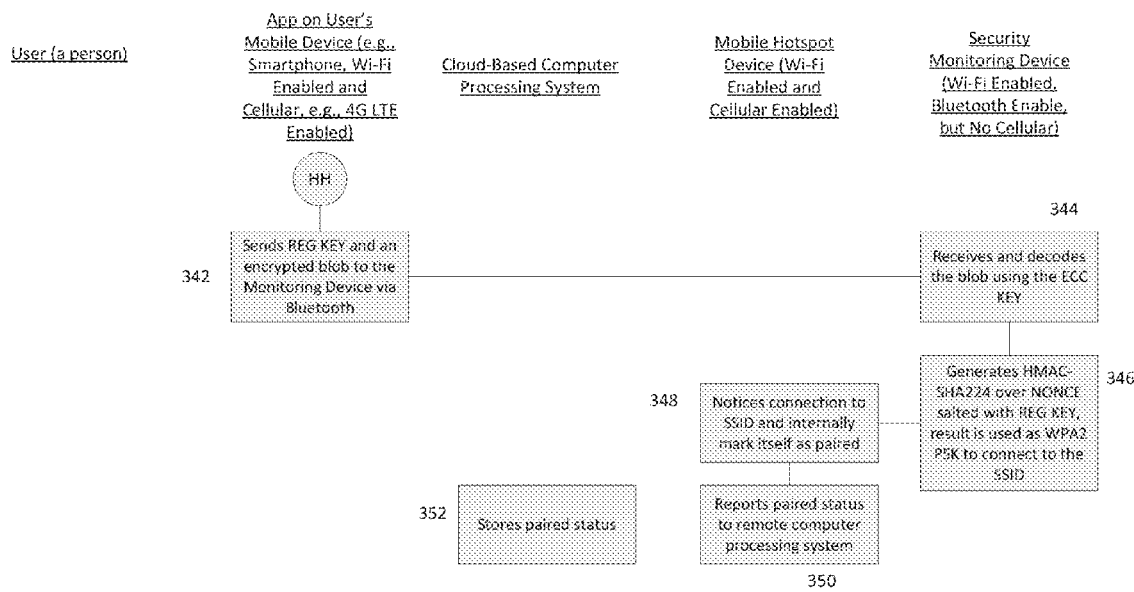

FIGS. 4A-4C show a flowchart that outlines a detailed exemplary implementation of a pairing process, like the high level pairing process represented in FIG. 1, which was discussed above.

The activities represented in the illustrated flowchart are organized into columns, each of which corresponds to one of several different entities, some of which are represented in the exemplary system 100 of FIG. 1. In particular, the entities represented by the different columns include: a system user (first column), a software app on the user's mobile device 108 (second column), the remote, cloud-based computer processing system 106 (third column), the mobile hotspot device 104 (fourth column), and the monitoring device 102 (fifth column). Generally speaking, in a typical implementation, each activity in the flowchart is performed by the entity that corresponds to the column where the activity appears.

According to the illustrated implementation, a user (at 302) activates the mobile hotspot device 104.

Generally speaking, at this point, the mobile hotspot device 104 (at 304) establishes a cellular (e.g., 4G LTE) connection to the remote, cloud-based computer processing system 106. However, the mobile hotspot device 104 is not yet acting as a Wi-Fi access point for the security monitoring device 102.

Next, according to the illustrated implementation, the mobile hotspot device 104 (at 306) generates a service set identifier (SSID) and a nonce.

Generally speaking, the service set identifier (SSID) is a unique alphanumeric code that will serve as the name of the basic service set that includes the access point provided by the mobile hotspot device 104 and any stations that will connect to that access point including, for example, the security monitoring device 102. In one exemplary implementation, the SSID includes a pre-determined, known prefix, followed by five randomly-generated alphanumeric characters (e.g., CNRY-yyyyy). In a typical implementation, during system operation, the SSID is attached to the header of any packets sent by devices trying to communicate on the basic service set (BSS). Generally speaking, the SSID can differentiate one WLAN from another, so all access points and all devices attempting to connect to a specific WLAN generally use the same SSID.

Generally speaking, a nonce is an arbitrary number, or alphanumeric code, that is only used once. It may be, for example, a random or pseudo-random number, or alphanumeric code. In one exemplary implementation, the nonce is a random 32 byte hex string (e.g., 3f3e2c10aa99402abb1acc331454A6f78e9d2201204d4Ccc 09ff2378f5901112d4).

Next, according to the illustrated implementation, the mobile hotspot device 104 (at 308) generates a keyed-hash message authentication code (e.g., an HMAC-SHA224 digest of the nonce using the registry key (REG_KEY) as salt).

In cryptography, a keyed-hash message authentication code (HMAC) is a specific type of message authentication code (MAC) involving a cryptographic hash function in combination with a secret cryptographic key and salt refers to data that may be used as an additional input to the cryptographic hash function. SHA224 refers to a particular type of secure hash algorithm (SHA) that may be used to calculate the HMAC. The SHA-2 family of algorithms generally consists of six hash functions with digests (i.e., hash values) that are 224 bits.

Generally speaking, the keyed-hash MAC may be used to verify both the data integrity and authentication of a message.

Next, according to the illustrated implementation, the mobile hotspot device 104 (at 310) begins broadcasting the service set identifier (SSID) with the generated digest (i.e., the HMAC-SHA224 digest) as its WPA2 PSK.

Generally speaking, WPA2 PSK refers to Wi-Fi Protected Access 2-Pre-Shared Key. It essentially is a method of securing a network using WPA2 with the use of an optional Pre-Shared Key (PSK) authentication.

WPA is a Wi-Fi standard security protocol that was designed to improve upon the security features of the Wired Equivalent Privacy (WEP) security protocol; WEP is a security protocol that was designed to provide the same level of security as that of a wired local area network (LAN). Wi-Fi Protected Access 2 is a follow on security method to WPA for wireless networks that provides stronger data protection and network access control. It provides Wi-Fi users with a high level of assurance that only authorized users can access their wireless networks. WPA2 is based on the IEEE 802.11i standard.

Generally speaking, a pre-shared key (PSK) is a shared secret which was previously shared between the two parties using some secure channel before it needs to be used. To build a key from shared secret, a key derivation function may be used.

In WPA2 PSK, both the wireless access point (e.g., at the mobile hotspot device 104) and all clients (e.g., the security monitoring device) share the same key.

Next, according to the illustrated implementation, the mobile hotspot device 104 (at 312) reports the registry key (REG_KEY), the service set identifier (SSID), the serial number of the mobile hotspot device and the nonce to the cloud-based computer processing system 106.

Generally speaking, the cloud-based computer processing system 106 in a particular system (e.g., system 100) may interact with several groups of mobile hotspot devices, security monitoring devices and user mobile devices. In some implementations, one or more of the registry key (REG_KEY), the service set identifier (SSID), the serial number of the mobile hotspot device and the nonce help the cloud-based computer processing system distinguish the mobile hotspot device 104, security monitoring device 102 and user mobile device 108 of system 100 from other mobile hotspot devices, security monitoring devices and user mobile devices in other systems that might be similarly connected to the cloud-based computer processing system.

In a typical implementation, this information (i.e., the registry key (REG_KEY), the service set identifier (SSID), the serial number of the mobile hotspot device and the nonce) is reported to the cloud-based computer processing system 106 via an SSL connection. The information, for example, may be sent as a simple endpoint JavaScript Object Notation (JSON) post.

The cloud-based computer processing system 106 (at 314) receives the reported information (i.e., the registry key (REG_KEY), the service set identifier (SSID), the serial number of the mobile hotspot device and the nonce) and (at 316) checks for any collisions or contradictions.

In a typical implementation, checking for any collisions or contradictions (at 316) involves determining whether there is any reason why the particular mobile hotspot device in question (e.g., 104) and the particular security monitoring device in question (e.g., 102) should not be paired to each other. For example, in some implementations, the computer-based processing system 106 might determine that the devices (104, 102) in question should not be paired to one another if the mobile hotspot device 104 in question (i.e., the device that corresponds with the reported information) already is associated with some other security monitoring device (e.g., a security monitoring device at a different location (e.g., a different person's home) than where the security monitoring device 102 in question is located).

If the cloud-based computer processing system 106 determines, for example, that the mobile hotspot device 104 that corresponds with the reported information already is associated with some other security monitoring device (e.g., at a different person's home), then an error status may be returned to the mobile hotspot and the cloud-based computer processing system does not proceed with registration. If, on the other hand, the cloud-based computer processing system 106 determines that the mobile hotspot device 104 is not already associated with some other security monitoring device, then the pairing process continues.

In some implementations, the cloud-based computer processing system 106 (at 316) also determines whether the mobile hotspot device in question (e.g., 104) is already associated with a different security monitoring device (other than 102) that the user has access to (e.g., a security monitoring device at a different location at the user's home). If the cloud-based computer processing system determines (at 316) that the mobile hotspot device in question (e.g., 104) is already associated with a different security monitoring device (other than 102) that the user has access to, the cloud-based computer processing system 106 may prompt the user (e.g., at a screen of the user's mobile device 108) to confirm that the mobile hotspot device in question (e.g., 104) should be associated with the new security monitoring device (e.g., 102) instead of the previous one. The cloud-based computer processing system 106 then makes changes (or does not make changes) based on the feedback provided by the user at his or her mobile device (e.g., 108).

In some implementations, the cloud-based computer processing system 106 also determines (at 316) whether the mobile hotspot device in question (e.g., 104) is already associated with the security monitoring device in question (e.g., 102). In a typical implementation, this kind of association, if it exists, would be stored in a memory storage device at the cloud-based computer processing system 106. If the cloud-based computer processing system 106 determines (at 316) that the mobile hotspot device in question (e.g., 104) is already associated with the security monitoring device in question (e.g., 102), then the cloud-based computer processing system 106 may prompt the user (e.g., at the screen of the user's mobile device 108) to confirm that he or she wants to once again pair these devices to each other. The cloud-based computer processing system then pairs (or does not pair) based on the feedback provided by the user at his or her mobile device (e.g., 108).

If the pairing process continues (after 316) then, according to the illustrated implementation, the cloud-based computer processing system 106 (at 318) registers the mobile hotspot device 104. In some implementations, this can be achieved by placing the current service set identifier (SSID) and nonce in a dedicated table in a same row with serial number and registry key (REG_KEY), the latter acting as retrieval keys for the row. Such a mechanism would allow simultaneous retrieval of all the relevant information when needed.

Steps 306 to 318 in FIGS. 4A-4C roughly correspond to the first step represented in the pairing process of FIG. 1 (i.e., the mobile hotspot device 104 registering with the cloud-based computer processing system 106). At this point, the mobile hotspot device 104 has essentially provided sufficient information to the cloud-based computer processing system 106 that enables the cloud-based computer processing system 106 to recognize or be aware of the mobile hotspot device 104.

Referring again to FIGS. 4A-4C, (at 320), the app on the user's mobile device 108 causes a wireless connection to be established between the mobile device 108 and the security monitoring device 102. In a typical implementation, the wireless connection between the mobile device 108 and the security monitoring device 102 relies upon Bluetooth® technology. The security monitoring device 102 (at 322) accepts the wireless connection.

Next (at 324), the security monitoring device 102 transmits a universally unique identifier (UUID) over the Bluetooth® connection to the app on the user's mobile device 108. In a typical implementation, the UUID is an alphanumeric code that uniquely identifies the security monitoring device 102. Typically, the UUID is reported by a computer chip in the security monitoring device 102 (e.g., a crypto chip, such as ones that are available from the Atmel® company). The app on the user's mobile device 108 (at 326) receives the UUID from the security monitoring device 102.

Steps 324 and 326 in FIGS. 4A-4C correspond roughly to the second step in the pairing process of FIG. 1 (i.e., providing identifying information for the security monitoring device 102 to the app on the user's mobile device 108).

Next, according to the implementation in FIGS. 4A-4C, the app on the user's mobile device 108 (at 328) prompts the user to provide a registry key (REG_KEY) for the mobile hotspot device 104. Generally speaking, the registry key (REG_KEY) is a code that can be used to identify the mobile hotspot device 104. More particularly, in some implementations, the registry key is a six character alphanumeric code. It may be printed on a sticker that is affixed to the mobile hotspot device 104. In various implementations, it can be text, a barcode, or a QR Code™ identifier.

The user (at 330) provides the registry key (REG_KEY) and the app on the user's mobile device 108 (at 332) receives the registry key (REG_KEY) for the mobile hotspot device 104.

Steps 328 to 332 in FIG. 4A-4C correspond roughly to steps three, four and five in the pairing process represented in FIG. 1, where the user essentially provides the app with identifying information for the mobile hotspot device 104 and the security monitoring device 102 essentially provides the app with identifying information for itself.

Next, according to the illustrated implementation in FIGS. 4A-4C, the app on the user's mobile device 108 (at 333) sends a pairing request to the cloud-based computer processing system 106. In a typical implementation, the pairing request includes identifying information for the mobile hotspot device 104 (e.g., the registry key, REG_KEY) and for the security monitoring device 102 (e.g., the UUID). Moreover, in a typical implementation, the pairing request is sent utilizing TLS. The cloud-based computer processing system 106 (at 334) receives the pairing request (e.g., with the REG_KEY and the UUID) from the app on the user's mobile device 108.

Steps 333 and 334 in FIGS. 4A-4C roughly correspond to step four in FIG. 1, where the pairing request is sent from the app on the user's mobile device 108 to the cloud-based computer processing system 106.

Next, according to the implementation in FIGS. 4A-4C, the computer-based processing system 106 (at 336) checks for collisions or contradictions.

If the cloud-based computer processing system 106 determines, for example, that the mobile hotspot device 104 that corresponds with the reported information already is associated with some other security monitoring device (e.g., at a different person's home), then an error status may be returned to the mobile hotspot and the cloud-based computer processing system does not proceed with registration. If no collisions or contradictions are found, then the computer-based processing system 106 (at 338) sends a response to the app on the user's mobile device 108 approving the pairing request.

In some implementations, a positive response to the pairing request (i.e., an approval of the pairing request) includes a blob (e.g., a collection of binary data) that contains the service set identifier (SSID) and the nonce encrypted with an ECC_PUB that matches the universally unique identifier (UUID) for the security monitoring device 102. Generally speaking, the term ECC_PUB refers to a cryptographic key. In a typical implementation, the ECC_PUB key may be a public key that has been derived from a private key (e.g., ECC_KEY) that was generated by and/or was stored at the crypto chip inside the security monitoring device 102.

The software application on the user's mobile device 108 then receives the blob (at 340).

Steps 338 and 340 in FIGS. 4A-4C roughly correspond to step five in FIG. 1, where the pairing request response is sent from the cloud-based security monitoring system 106 to the software application on the user's mobile device 108.

Next, the software application on the user's mobile device 108 (at 342) provides the security monitoring device 102 the registry key REG_KEY (i.e., the alphanumeric code that the user entered into his or her mobile device 108 (at 330) and the encrypted blob that the software application received (at 340) from the cloud-based computer processing system 106.

The security monitoring device 102 (at 344) receives the registry key REG_KEY and the encrypted blob and decodes the encrypted blob.

Steps 342 and 344 in FIGS. 4A-4C roughly correspond to step six in FIG. 1, where the software application at the user's mobile device 108 provides the registry key and encrypted blob to the security monitoring device 102.

In a typical implementation, the security monitoring device 102 uses the ECC_KEY (i.e., an ECC private key generated and/and stored at or by a crypto chip in the security monitoring device 102) to decode the encrypted blob. In this example, the decoding performed by the security monitoring device reveals the service set identifier (SSID) and the nonce.

Next, the security monitoring device 102 generates (at 346) a keyed-hash message authentication code (e.g., an HMAC-SHA224 digest of the nonce using the registry key REG_KEY as salt). The security monitoring device 102 uses this keyed-hash message authentication code as Wi-Fi Protected Access 2-Pre-Shared Key (WPA2-PSK) to connect, using Wi-Fi, to the service set associated with the previously decrypted SSID.

The mobile hotspot device 104 (at 348) notices the connection to the SSID be the security monitoring device 102 and marks itself (e.g., notating its internal memory) as being paired with the security monitoring device 102.

Steps 346 and 348 in FIGS. 4A-4C roughly correspond to step seven in FIG. 1, where the security monitoring device 102 connects to the mobile hotspot device 104.

The mobile hotspot device 104 (at 350) reports its status (i.e., "paired to the security monitoring device 102") to the cloud-based computer processing system 104. The cloud-based computer processing system 106 then (at 352) stores this pairing (i.e., the association between the mobile hotspot device 104 and the security monitoring device 102) in its memory (e.g., for potential future collision evaluation (such as represented in 316 and 336).

FIGS. 5A-5D show a flowchart that outlines a detailed exemplary implementation of an alternative pairing process.

According to the illustrated implementation, (at 502) a user powers up the mobile hotspot device 104.

The mobile hotspot device 104 then (at 504) turns on its cellular technology. At this point, a Wi-Fi access point is not available.

Next, the mobile hotspot device 104 (at 506) sends information via a cellular connection to the cloud-based computer processing system. According to the illustrated example, the transmitted information includes a unique pairing code for the mobile hotspot device and a unique identification code for the mobile hotspot device. In some implementations, the transmitted information may also include BSSID for stricter verification. The transmitted information is received by the cloud-based computer processing system 106 (at 508).

Next, according to the illustrated implementation, a user (at 510) causes or allows his or her mobile device 108 to establish a connection to the security monitoring device 102. The mobile device 108 then (at 512) establishes a secure connection to the security monitoring device 102. In the illustrated example, the secure connection is based on Bluetooth® technology. However, in some implementations, this (and other Bluetooth® connections described herein) can be implemented using other types of connection technology, such as Wi-Fi or other device-to-device connection technologies. The security monitoring device 102 (at 514) accepts the secure connection.

Next (at 516), according to the illustrated implementation, the user makes a selection (e.g., in the software application on the user's mobile device 108) indicating that the desired connection for the security monitoring device 102 will be through the mobile hotspot device 104. The software application on the user's mobile device 108 then (at 518) prompts the user to indicate whether the mobile hotspot device 104 will be a primary connection or secondary connection for the security monitoring device 102.

Figure 5A:
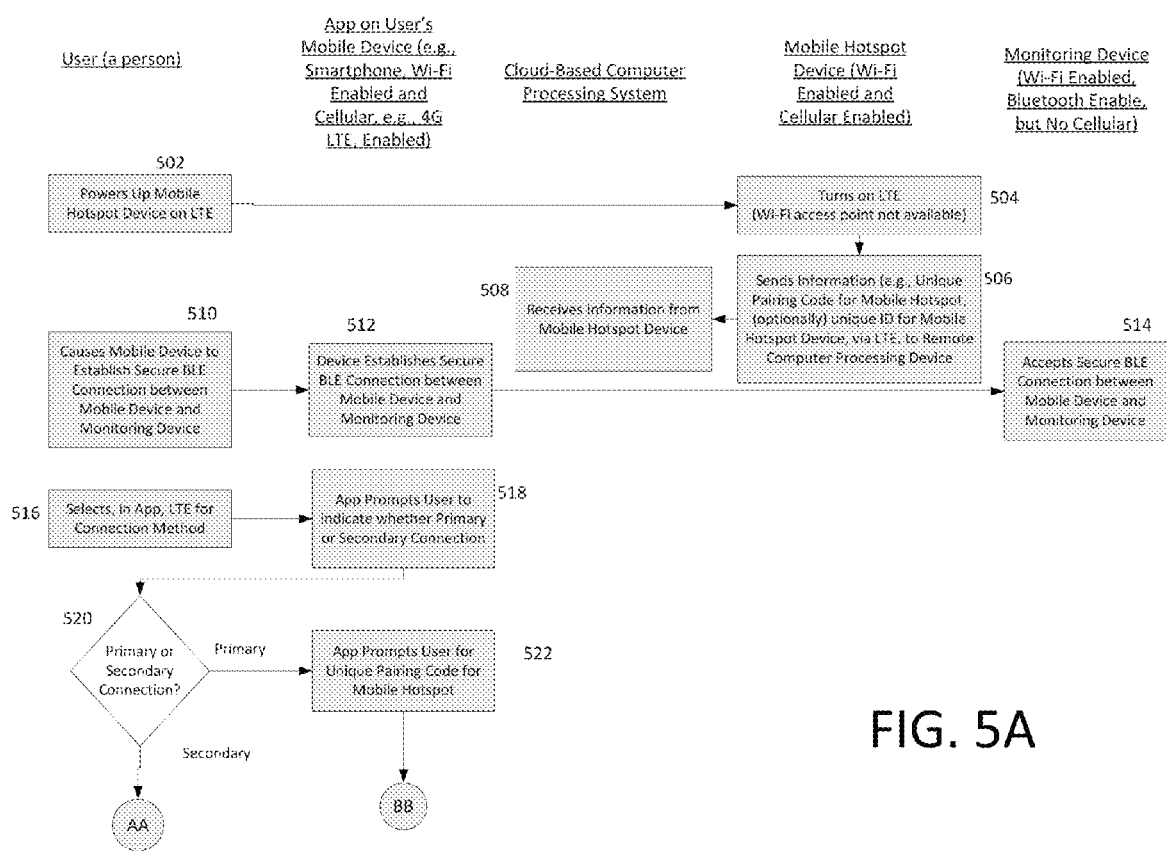
FIGS. 5A-5D show a flowchart that outlines an exemplary implementation of an alternative pairing process.
Figure 5B:
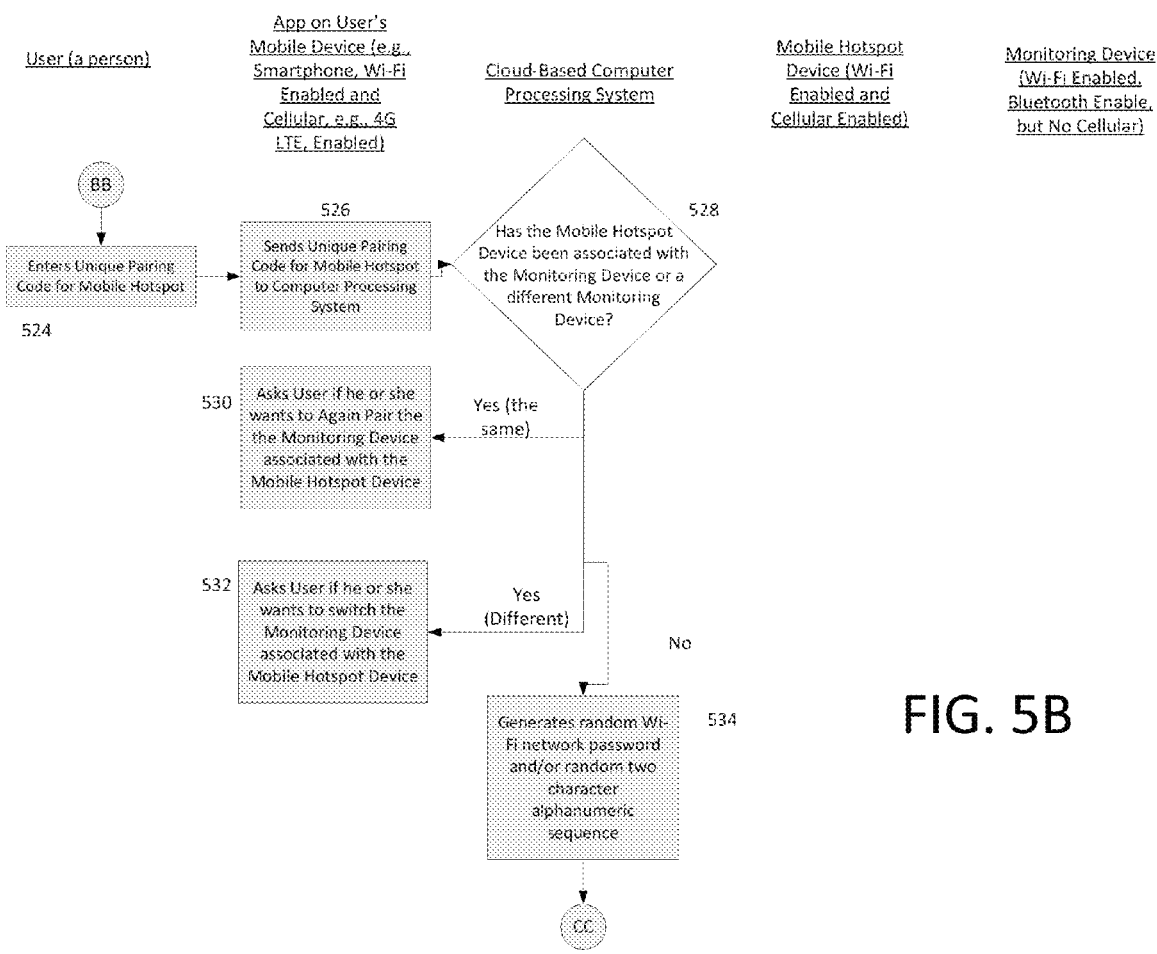
Figure 5C:
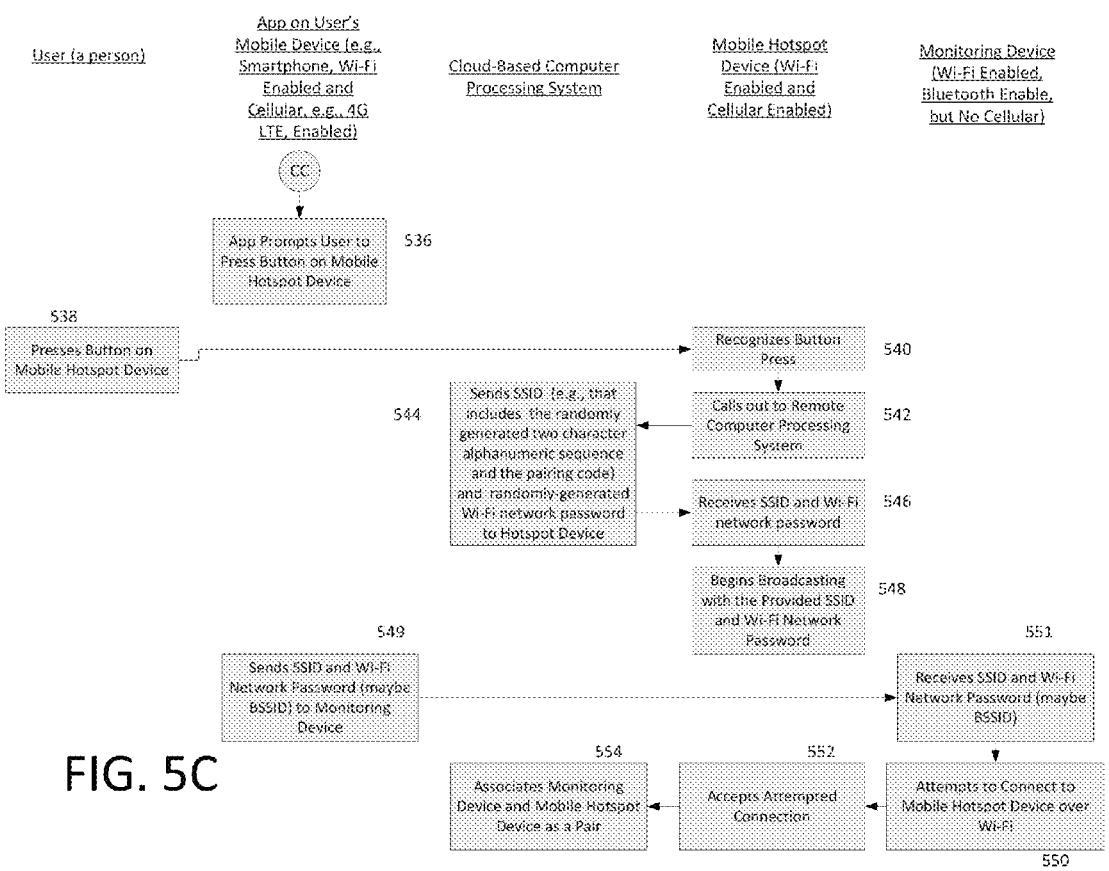
Figure 5D:
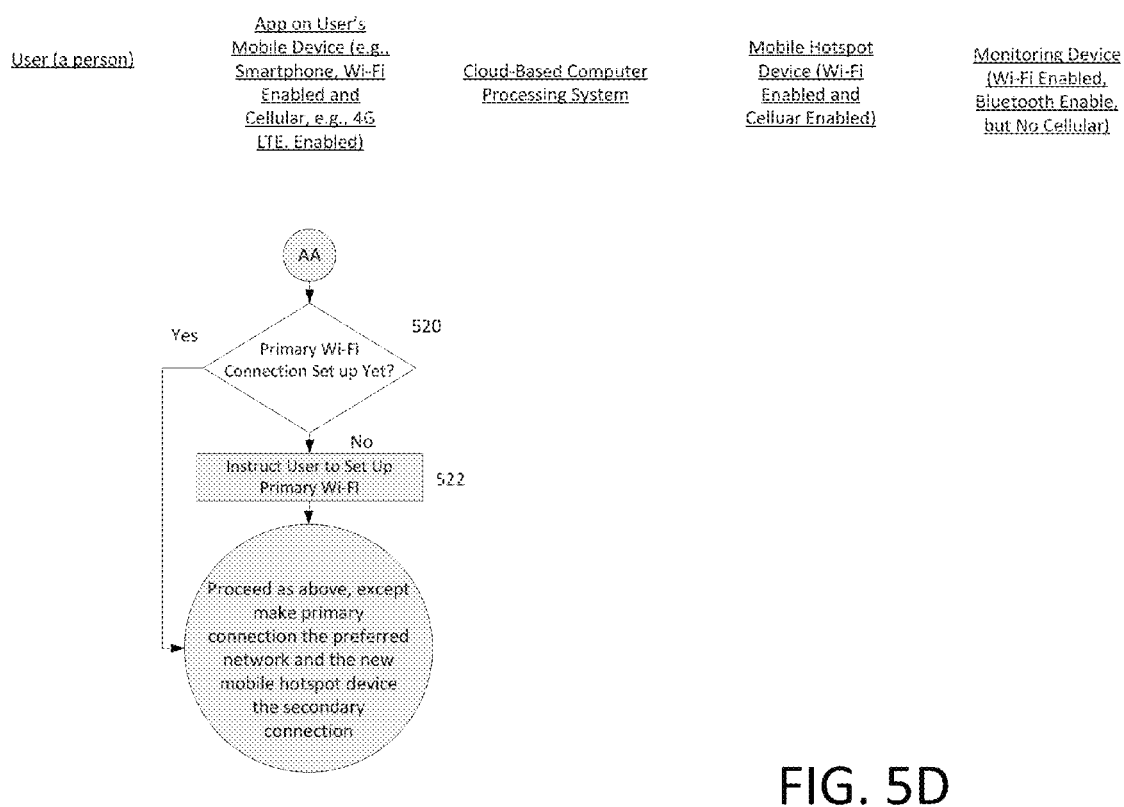

If the user indicates (at 520) that the mobile hotspot device 104 will be a secondary connection for the security monitoring device 102, then the process proceeds as indicated to FIG. 5D. If no primary Wi-Fi connection has been set-up yet (521), the system instructs the user to set that first. If the primary connection already has been set, the system makes the primary connection the preferred network and the mobile hotspot device a secondary network, the process continues as indicated.

Generally speaking, once paired, if the mobile hotspot device has been designated as a secondary (or backup) network (or connection), after some period of time (e.g., 1 minute), of loss of the primary network, the security monitoring device will switch to use the secondary (or backup) mobile hotspot device. In a typical implementation, if the connection to the cloud-based computer processing system via the mobile hotspot device succeeds, then the system will periodically (e.g., every 5 minutes) try to reconnect to the primary network (or connection). Moreover, in a typical implementation, if the connection to the cloud-based computer processing system via the mobile hotspot device fails, then the system will periodically try to reconnect to the primary network (or connection) and may periodically also try to connect to the mobile hotspot device (if the primary connection remains unavailable).

Otherwise, if the user indicates (at 520) that the mobile hotspot device 104 will be a primary connection for the security monitoring device 102, then the software application on the user's mobile device 108 (at 522) prompts the user to provide a pairing code for the mobile hotspot device 104. Next, the user (at 524) enters (e.g., types in or scans, etc.) the pairing code for the mobile hotspot device 104 into the software application on the user's mobile device 108.

Then, the software application on the user's mobile device 108 (at 526) sends the pairing code for the mobile hotspot device 104 to the cloud-based computer processing system 106. The cloud-based computer processing system 106 (at 528) determines whether the mobile hotspot device 104 already is associated with security monitoring device 102 in question or any other security monitoring devices.

If the cloud-based computer processing system determines (at 528) that the mobile hotspot device 104 already is associated with the security monitoring device 102 in question, it (at 530) presents a question to the user (e.g., at a screen on the user's mobile device 108) asking if the user wants to again pair the security monitoring device 106 to the mobile hotspot device 102 in question.

If the cloud-based computer processing system determines (at 528) that the mobile hotspot device 104 already is associated with a different security monitoring device, it (at 532) presents a question to the user (e.g., at a screen on the user's mobile device 108) asking if the user wants to switch the monitoring device associated with the mobile hotspot device 102.

If the cloud-based computer processing system determines (at 528) that the mobile hotspot device 104 already is associated with a different account, the system prevents the user from changing any configurations, until and unless another user (i.e., the owner of the other account) releases it. In some implementations, when this happens, the user whose account is associated with the mobile hotspot device 104 may be able to release the mobile hotspot device 104 from his or her account. In that situation, the software application for that user may send a release message to the cloud-based computer processing system 106. In response, the cloud-based computer processing system deletes the pairing from its memory. The cloud-based computer-processing system then sends or queues a message for the mobile hotspot device to turn off (or restart) its Wi-Fi network.

If the determines (at 528) that the mobile hotspot device 104 already is associated with the security monitoring device 102 in question, and the user has responded to any questions presented, or if the mobile hotspot device 104 is not associated with any security monitoring device, then the cloud-based computer processing system 106 (at 534) generates a Wi-Fi network password and a random alphanumeric sequence (e.g., a two character sequence). This is, of course, just an example. Generally speaking, there should be some non-static, non-predictable component to SSID generated here.

The software application on the user's mobile device 108 then (at 536) prompts the user, for example, to press a button on the mobile hotspot device 104. According to the illustrated implementation, the user presses the button on the mobile hotspot device (at 538). The mobile hotspot device 104 (at 540) recognizes the button press and (at 542) calls out to the cloud-based computer processing system 106.

Next, according to the illustrated implementation, the cloud-based computer processing system 106 (at 544) sends to the mobile hotspot device, with TLS: 1) an SSID (e.g., in the form of Canary_X2_123-AF6, or a similar known pattern among devices in system 100), where X2 is the two character sequence and 123-AF6 is from the pairing code, and 2) the randomly-generated password. The mobile hotspot device (at 546) receives the information, and (at 548) begins broadcasting with the SSID using the Wi-Fi network password.

The cloud-based computer processing system (at 549) sends to the security monitoring device 102: the SSID provided to the mobile hotspot device 104 and the password that was provided to the mobile hotspot device 104. In some implementations, the software application on the user's mobile device 108 (at 546) also sends to the security monitoring device 102 a BSSID for the mobile hotspot device 104.

The security monitoring device 102 (at 551) receives the transmitted information and (at 550) attempts to connect to the mobile hotspot device over Wi-Fi using the transmitted information. In the illustrated implementation, the mobile hotspot device 104 (at 552) accepts the attempted connection. Then, the cloud-based computer processing system 106 (at 554) stores an association between the now-connected (now-paired) security monitoring device and mobile hotspot device.

Figure 6A:
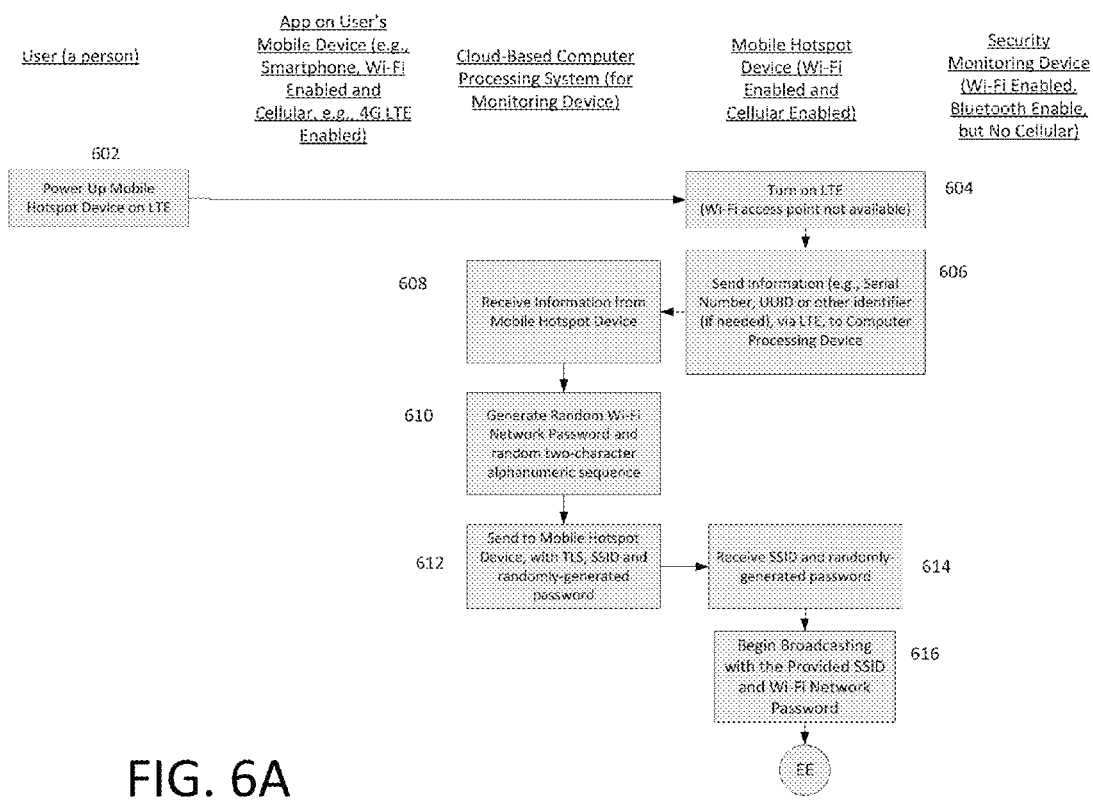
FIGS. 6A-6C show a flowchart that outlines an exemplary implementation of yet another alternative pairing process. The second section of drawings includes.
Figure 6B:
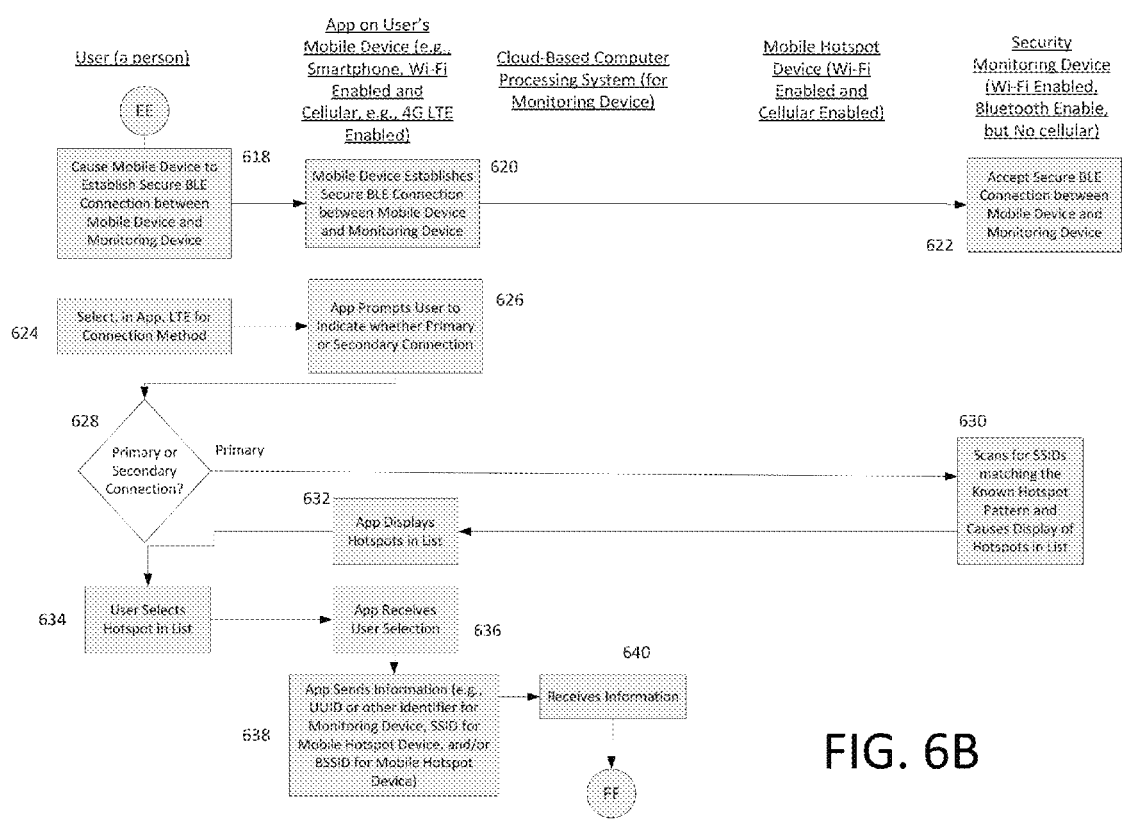
Figure 6C:
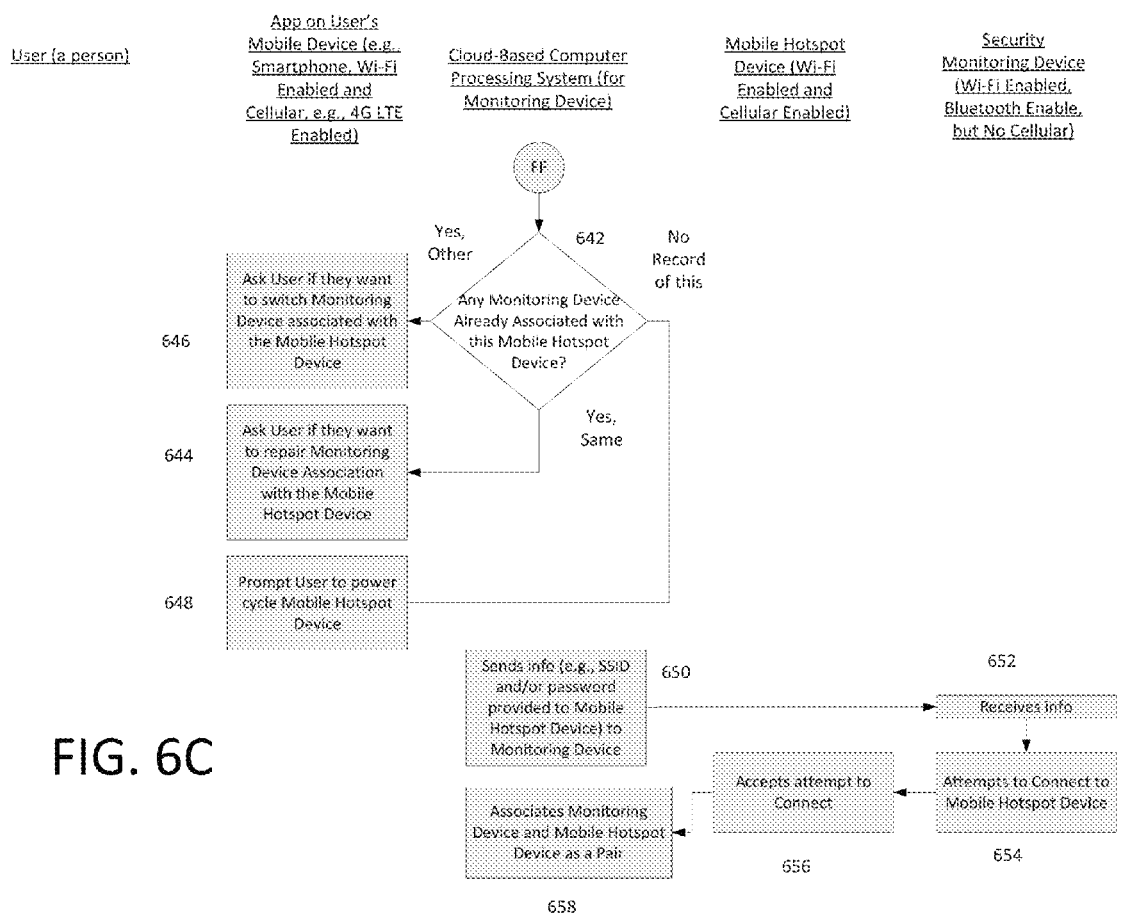

FIGS. 6A-6C show a flowchart that outlines a detailed exemplary implementation of yet another alternative pairing process.

According to the illustrated implementation, (at 602) a user powers up the mobile hotspot device 104. The mobile hotspot device 104 then (at 604) turns on its cellular technology. At this point, a Wi-Fi access point is not available.

Next, the mobile hotspot device 104 (at 606) sends information via a cellular connection to the cloud-based computer processing system 106. According to the illustrated example, the transmitted information includes a serial number, a universally unique identifier (UUID) or other identifier (if needed). In some implementations, the transmitted information may also include BSSID for stricter verification. The transmitted information is received by the cloud-based computer processing system 106 (at 608).

Next (at 610), according to the illustrated implementation, the cloud-based computer processing system 106 generates a random Wi-Fi network password and a random two-character alphanumeric sequence.

The cloud-based computer processing system 106 then (at 612) sends to the mobile hotspot device 104, with TLS: 1) an SSID to use (e.g., in the form of Canary_X2_12-3A-F6, or similar), where X2 is the two character sequence and 12-3A-F6 may be from the BSSID, and 2) the randomly-generated password.

The mobile hotspot device 104 (at 614) receives the transmitted information and (at 616) uses the SSID and/or the password to begin broadcasting.

Next, in the software application on the user's mobile device 108, the user begins to setup or change the Wi-Fi connection configuration. In a typical implementation, during the setup process, the user may specify (via the app) that the mobile hotspot device 104 will serve as the network connection point for the security monitoring device 102. Moreover, in a typical implementation, during the setup process, the software application on the user's mobile device 108 may prompt the user, via the app, to designate the connection as either primary or secondary.

In the illustrated implementation, the user (at 618) causes his or her mobile device 108 to establish a secure wireless connection to the security monitoring device 102. The mobile device 108 (at 620) responds accordingly and the security monitoring device 102 (at 622) accepts the secure connection.

The user (at 624) indicates, in the application at his or her mobile device 108, that the mobile hotspot device 104 will serve as the network connection point for the security monitoring device 102. The application then (at 626) prompts the user to indicate whether the connection should be a primary or secondary connection. The user, in the illustrated implementation, (at 628) selects primary.

Next (at 630), the security monitoring device scans for SSIDs matching the known hotspot pattern for the security monitoring device and causes the app to display (at 632) the hotspots in a list.

In a typical implementation, at this point, the user is able, via the app, to select an appropriate hotspot from among the list, cancel the process or cause the system to scan again. In the illustrated implementation, the user (at 634) selects one of the listed hotspots. The application on the user's mobile device 108 receives the user's selection (at 636). Then, the application (at 638) contacts the cloud-based computer processing system 106 and sends it information including, for example, the UUID (or other identifier) for the security monitoring device and the SSID for the mobile hotspot device. In some implementations, the application also sends a BSSID for the mobile hotspot device. The cloud-based computer processing system receives the transmitted information (at 640).

Next (at 642), the cloud-based computer processing system 106 determines whether any monitoring device already is associated with the mobile hotspot device 104. If the cloud-based computer processing system 106 determines that the security monitoring device 102 in question already is associated with the mobile hotspot device 104, it causes the system to ask (at 644) the user if he or she wants to repair the association between the security monitoring device 102 in question already is associated with the mobile hotspot device 104. If the cloud-based computer processing system 106 determines that a different security monitoring device is associated with the mobile hotspot device 104, it causes the system to ask (at 646) the user if he or she wants to switch the association to the new security monitoring device. If the cloud-based computer processing system 106 finds no such records, it causes the system to prompt the user (at 648) to power cycle the mobile hotspot device 104.

Next (at 650), the cloud-based computer processing system 106 sends information to the security monitoring device 102. In some implementations, the information can include the SSID and/or password. The security monitoring device 102 (at 652) receives the information. Then, it attempts (at 654) to connect to the mobile hotspot device 104. In the illustrated example, the mobile hotspot device 104 (at 656) accepts the attempt to connect. Then, the cloud-based computer processing system 106 (at 658) creates a logical association in its database between the security monitoring device 102 and the mobile hotspot device 104.

A number of embodiments of the invention have been described. Nevertheless, it will be understood that various modifications may be made without departing from the spirit and scope of the invention.

For example, the security monitoring device can have any one of a variety of possible configurations. Its housing can take on any number of a variety of different physical configurations.

Moreover, the security monitoring device can include any one or a combination of a variety of different sensors. In various implementations, these sensors can be or can be configured to detect any one or more of the following: light, power, temperature, RF signals, a scheduler, a clock, sound, vibration, motion, pressure, voice, proximity, occupancy, location, velocity, safety, security, fire, smoke, messages, medical conditions, identification signals, humidity, barometric pressure, weight, traffic patterns, power quality, operating costs, power factor, storage capacity, distributed generation capacity, UPS capacity, battery life, inertia, glass breaking, flooding, carbon dioxide, carbon monoxide, ultrasound, infra-red, microwave, radiation, microbes, bacteria, viruses, germs, disease, poison, toxic materials, air quality, lasers, loads, load controls, etc.

In a typical implementation, the security monitoring device has a single housing and any camera(s), audio elements (e.g., microphones, etc.) and any other sensors are contained within or securely attached to the single housing. Moreover, in the a typical implementation, there is a computer-based processor, a computer-based memory storage unit, and one or more chips to facilitate wireless communications as described herein—all within the single housing as well.

Similarly, the mobile hotspot device can have any one of a variety of possible configurations. Generally speaking, in a typical implementation, the mobile hotspot device can be any device that can provide hotspot functionality. Moreover, generally speaking, hotspot functionality provides Internet access, typically using Wi-Fi technology (e.g., via a wireless local area network) or the like. The housing of the mobile hotspot device can take on any number of a variety of different physical configurations. Moreover, in various implementations, it can be configured to facilitate a variety of other functionalities, not specifically mentioned herein. Moreover, the mobile hotspot device is referred to throughout this document as being "mobile" because it has the ability to provide hotspot functionality where ever it goes. That said, in practice, when installed, the mobile hotspot device typically is stationary (e.g., securely attached to a wall, pole, or other mounting surface).

The method of physically connecting the security monitoring device to the mobile hotspot device can vary. For example, in some implementations, the connection technique will not require the separate cover described herein that helps secure the security monitoring device to the mobile hotspot device. Moreover, in some implementations, the security monitoring device and the mobile hotspot device may be configured so that they do not necessarily touch each other at all when they are paired and working together as described herein.

The user's mobile device can be virtually any kind of mobile computing device. Generally speaking, the mobile device will be a small computing device, typically small enough to be handheld, having a display screen, possibly with touch input functionality and/or a miniature keyboard and weighing less than 2 pounds or so. The mobile device will typically have an operating system, and can run various types of application software, known as apps. Most handheld devices also are equipped with Wi-Fi, Bluetooth, etc. and can allow connections to the Internet and to other devices.

In various implementations, the mobile device can be a smart phone, a tablet computer, a smartwatch, a personal digital assistant, or any other similar type of product.

In various implementations, some or all of the functionalities described as being attributable to an app on the user's mobile device may, instead, be performed by software stored in the system outside of the user's mobile device.

The devices described herein as being paired to one another are a security monitoring device and a mobile hotspot device. The inventive concepts, however, should not be limited solely to pairing a security monitoring device to a mobile hotspot device. Instead, the concepts can apply more broadly to pairing virtually any two types of devices. For example, the concepts can apply to pairing any device that lacks cellular communication capabilities (but has other types of communication capabilities, such as Wi-Fi and/or Bluetooth®) to any other device that is able to provide an access point (e.g., to the Internet).

The cloud-based computer processing system can be virtually any kind of cloud-based computer-processing system. Generally speaking, it will include a computer processor (or plurality of processors) and computer-based memory storage capacity. In some implementations, the cloud-based computer processing system may be based on a cloud computing solution built upon an Amazon Web Services™ (AWS) cloud computing system.

In various implementations, one or more of the devices disclosed herein may be configured to communicate wirelessly over a wireless communication network via any one or more of a variety of wireless communication protocols including, but not limited to, cellular communication, ZigBee, REDLINK™, Bluetooth, Wi-Fi, IrDA, dedicated short range communication (DSRC), EnOcean, and/or any other suitable common or proprietary wireless protocol.

It should be understood that relative terminology used herein, such as "above", "below", "front", "rear," etc. is solely for the purposes of clarity and is not intended to limit the scope of what is described here to require particular positions and/or orientations. Accordingly, such relative terminology should not be construed to limit the scope of the present application.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

The operations described in this specification can be implemented as operations performed by a data processing apparatus (e.g., a processor) on data stored on one or more computer-readable storage devices or received from other sources. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, some of the concepts disclosed herein can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The phrase computer-readable medium or computer-readable storage medium as used herein should be construed to include all mediums that are statutory (e.g., in the United States, under 35 U.S.C. §101), and, in some instances, to specifically exclude all mediums that are non-statutory in nature to the extent that the exclusion is necessary for a claim that includes the computer-readable (storage) medium to be valid. Some or all of the computer-readable media or storage media can be non-transitory.

Other implementations are within the scope of the claims. This section of the detailed description relates to the second section of drawings.

Figure 7:
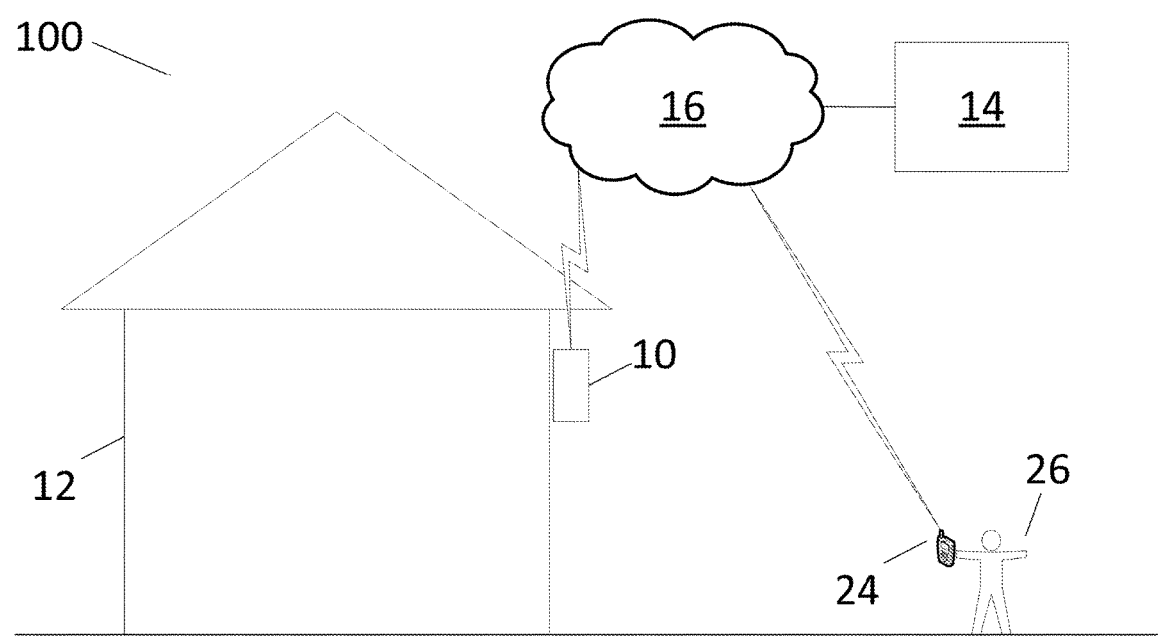
FIG. 7 is a schematic representation of an exemplary security monitoring system.

FIG. 7 is a schematic representation of an exemplary security monitoring system 100.

The illustrated security monitoring system 100 includes a security monitoring device 10 that is configured to monitor one or more security-related characteristics associated with the physical space where it is located (e.g., house 12). In a particular implementation, the security monitoring device 10 includes at least a camera and a motion sensor and is positioned just outside the house 12 to "watch" for potential intruders. In a typical implementation, the security monitoring device 10 collects data about the monitored physical space and communicates with a cloud-based security processing system 14 and/or one or more computer-based mobile devices (e.g., smartphone 24) via network 16 (e.g., the Internet). Generally speaking, the security monitoring system 100 is operable so that data (e.g., images or videos) captured by the security monitoring device 10 can be accessed or viewed from the smartphone 24. In a typical implementation, the smartphone 24 might have a software application ("app") running on it so as to facilitate this, and other, functionality.

The security monitoring device 10 in a typical implementation is battery operated and, as such, has a limited operating capacity. Accordingly, it is generally desirable to implement system 100 functionalities with an eye toward maximizing battery life (or, conversely, minimizing battery drain) to the extent reasonably possible.

The security monitoring device 10, in the illustrated example, has at least two different operating modes: a first (high functionality, high-power) active mode and a second (reduced functionality, low-power) sleep mode.

In active mode, the security monitoring device 10 generally consumes battery power at a high rate as compared to sleep mode. Typically, in active mode, the security monitoring device is actively collecting data (e.g., images or video from the monitored physical location using its camera), processing that data, and/or communicating over a secured wireless connection with the cloud-based security processing system 14 (and/or the mobile device 24). When the security monitoring device 10 is in active mode, the wireless connection may be secured with transport layer security (TLS). Generally speaking, TLS is a cryptographic protocol designed to provide communications security over a computer network (e.g., network 16). TLS can help ensure privacy and data integrity between two communicating computer entities, such as the security monitoring device 10 and the cloud-based security processing system 14.

In sleep mode, the security monitoring device 10 consumes battery power at a lower rate than it does when it is in active mode. Typically, in sleep mode, several components of the security monitoring device (e.g., the camera and the main processor) go to sleep (i.e., become inactive).

In a typical implementation, the security monitoring device 10 periodically toggles between the active mode and the sleep mode with an aim toward balancing effective system performance and satisfactory battery life.

For example, in some implementations, the security monitoring device 10 defaults to sleep mode and only awakens (to enter active mode) in response to some trigger, such as the motion sensor sensing motion in the monitored physical space. In those implementations, the security monitoring device 10 may remain active for some predetermined period of time after whatever stimulus caused the toggle disappears and then returns to sleep mode until another trigger happens. The amount of time that the security monitoring device 10 remains in active mode can vary, of course. In some implementations, for example, the security monitoring device 10 remains active for only as long as the trigger exists (e.g., for only as long as motion is being sensed at the monitored physical space). In some implementations, however, the security monitoring device 10 remains active for a short time after the trigger ceases to exist.

The security monitoring device 10 is generally able to establish a wireless connection (via network 16) to the security processing system 14 (and/or to the mobile device 24) while it is in active mode. Generally speaking, the security monitoring system 100 is operable to keep that wireless connection alive as the security monitoring device 10 toggles between active mode and sleep mode. In a typical implementation, keeping the wireless connection alive avoids having to reestablish a new wireless connection each time the security monitoring device reawakens to enter active mode. This helps preserve battery life and helps to ensure continuity of connection between the security monitoring device 10 and the security processing system 14.

Moreover, in a typical implementation, the wireless connection is kept alive in a manner that minimizes likelihood that a breach in security might happen on the wireless connection that is maintained between the security monitoring device 10 and the security processing system 14 (and/or smartphone). This is a particularly significant aspect of the present disclosure, because although the wireless connection is secured (e.g., by TLS) when the security monitoring device 10 is active, the wireless connection—to preserve battery life—is generally not secured (by TLS) when the security monitoring device is in sleep mode.

Figure 8:
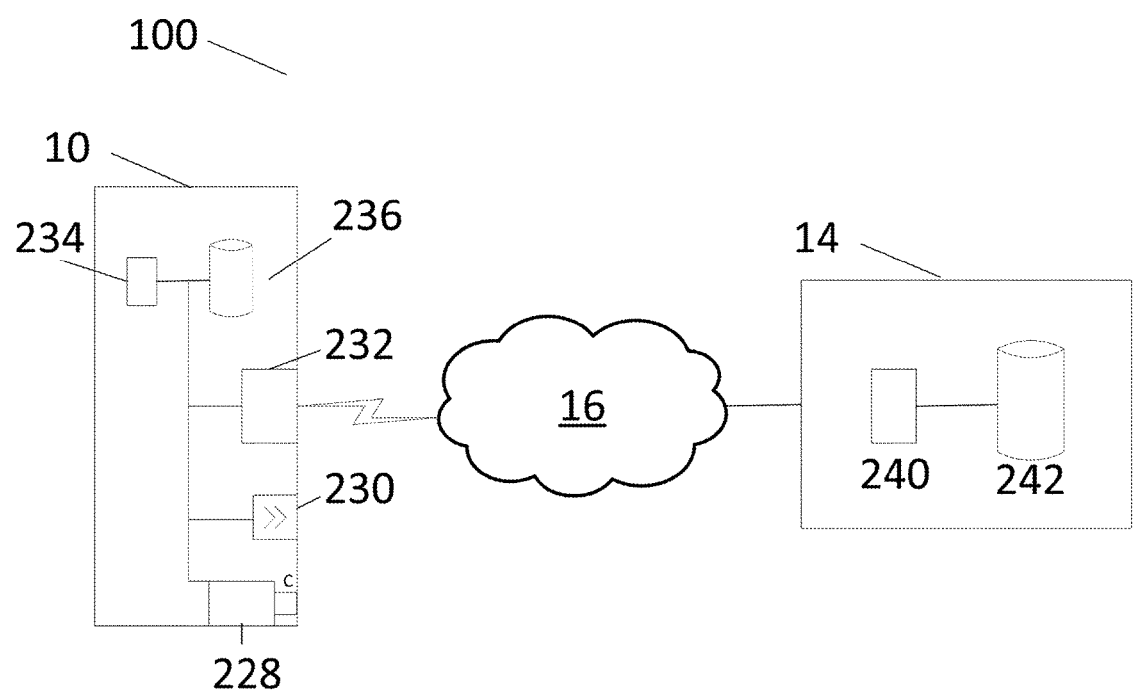
FIG. 8 is a somewhat more detailed schematic representation showing part of the security monitoring system from FIG. 7 including the security monitoring device (with certain components thereof) and the cloud-based security processing system (with certain components thereof) connected together via a network.

FIG. 8 is a somewhat more detailed schematic representation showing part of the security monitoring system 100 from FIG. 7 including the security monitoring device 10 (with certain components thereof) and the cloud-based security processing system 14 (with certain components thereof) connected together via the network 16.

In the illustrated implementation, the security monitoring device 10 has a housing 238 and the following components: a camera 228, a motion sensor 230, a Wi-Fi communications module 232, a main computer-based processor 234 and computer-based memory 236. Each of these components is coupled to (supported by) the single housing 238.

Generally speaking, the camera 228 is configured to capture images or video from the monitored physical space (i.e., the space where the security monitoring device 10 may be located).

The motion sensor 230 is configured to detect motion in the monitored physical space (e.g., a person moving toward house 12 where the security monitoring device 10 is located). The motion sensor 230 can be virtually any kind of motion sensor. In one example, the motion sensor 230 utilizes passive infrared (PIR) sensing technology, but other technologies are possible too. More particularly, in one implementation, motion sensing functionalities may be achieved by using a PIR sensor in conjunction with a Fresnel lens, which also would be coupled to the housing 10.

The Wi-Fi communications module can be virtually any kind of communications component that allows the security monitoring device 10 to connect to network 16 via a Wi-Fi connection (e.g., through a personal Wi-Fi network in the house 12).

The main computer-based processor 234 can be virtually any kind of processor(s) that is able to perform or facilitate one or more of the operations described herein as being attributable to or involving the security monitoring device 10. Some examples of these operations includes processing data from the motion sensor and/or the camera, executing functionalities defined by software that may be stored in the computer-based memory 236 and generally controlling operations associated with the security monitoring device 10 and its various components.

The computer-based memory 236 can be virtually any kind of memory storage device that is able to store data and/or instructions (e.g., software) to support or facilitate performance of one or more of the functionalities described herein as being attributable to the security monitoring device 10 and its various components.

In the illustrated implementation, the cloud-based security processing system 14 has a computer-based processor 240 and a computer-based memory 242. The computer-based processor 240 can be virtually any kind of device(s) able to perform or facilitate operations described herein as being attributable to or involving the security processing system 14. The computer-based memory 242 can be virtually any kind of memory storage device(s) able to store data or instructions (e.g., software) to facilitate performance of one or more functionalities described herein as being attributable to or involving the security processing system 14.

Figure 9:
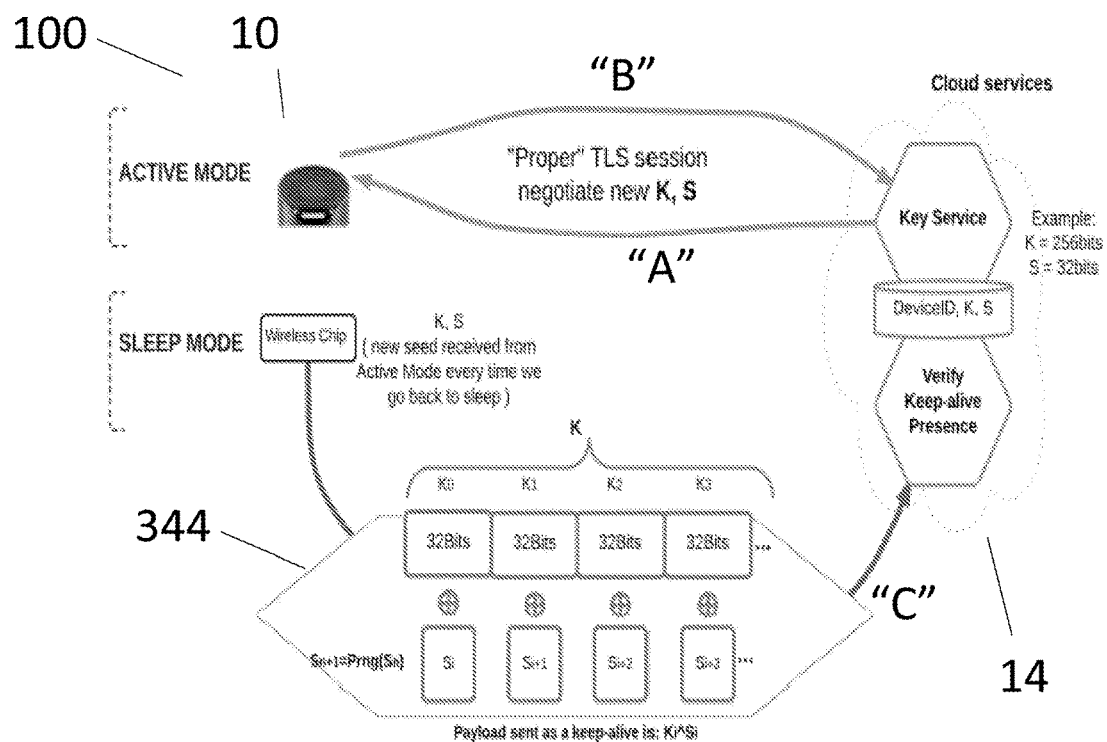
FIG. 9 is yet another schematic representation of the security monitoring device and the cloud-based computer processing system and includes details about one way in which the security monitoring device and the cloud-based computer processing system interact with each other.

FIG. 9 is yet another schematic representation of the security monitoring device 10 and the cloud-based computer processing system 14 and includes details about one way in which the security monitoring device 10 and the cloud-based computer processing system 14 interact with each other.

The figure includes two representations of the security monitoring device 10. The upper representation represents the security monitoring device 10 when it is in active mode (e.g., a high power, high functionality operating mode). The lower representation represents the security monitoring device 10 when it is in sleep mode (e.g., a low power, low functionality mode operating mode). As shown, the security monitoring device 10 communicates with the cloud-based security monitoring system 14 over a wireless connection whether it is in the active mode or the sleep mode. In a typical implementation, the security monitoring device 10 periodically toggles between the active mode and the sleep mode depending, for example, on whether the motion sensor 230 has detected any motion at the monitored physical location (e.g., house 12).

In a typical implementation, the system 100 is operable so that once a wireless connection is established between the security monitoring device 10 and the security processing system 14 is established, the wireless connection is maintained as the security monitoring device 10 subsequently toggles between the active mode and the sleep mode. Typically, the wireless connection is established during a period of time when the security monitoring device 10 is in the active mode. Moreover, the wireless connection is maintained in a secure manner.

In a typical implementation, maintaining the same wireless connection between the security monitoring device 10 and the security processing system 14, as the security monitoring device 10 toggles between operating modes (active and sleep), advantageously helps preserve battery life (at the battery-operated security monitoring device 10) and helps to ensure continuity of connection between the security monitoring device 10 and the security processing system 14.

According to the illustrated implementation, when the security monitoring device 10 is in active mode and the wireless connection is secured by TLS, the security monitoring device 10 and the cloud-based security processing system 14 negotiate a first seed S and first nonce K over the secured wireless connection. Generally speaking, the first seed S is a number (e.g., a sequence of bits) used to initialize a pseudo-random number generator. Moreover, generally speaking, the nonce K is an arbitrary number (e.g., a sequence of bits) generally used only once. In a typical implementation, both the first seed S and the first nonce K are generated in a random or pseudo-random manner. As discussed in detail herein, the first seed S and the first nonce K are used to help secure the transmission of keep-alive messages between the security monitoring device 10 and the security processing system 14 over the wireless connection when that wireless connection is not otherwise secured by TLS.

Generally speaking, a keep-alive message may be sent as check that the wireless connection between the two system components is operating properly, and/or to prevent the wireless connection from being broken.

According to the illustrated example, the first seed S and the first nonce K are generated at the cloud-based security processing system 14. In this regard, the cloud-based security processing system 14 includes one or more generators (e.g., random or pseudorandom number generator(s)) to generate the first seed S and the first nonce K.

The cloud-based security processing system 14 transmits (see arrow "A") the first seed S and the first nonce K across the TLS secured wireless connection to the security monitoring device 10. The security monitoring device 10 saves a copy of the first seed S and the first nonce K in its memory (e.g., 236). The security monitoring device 10 then transmits (see arrow "B") the first seed S and the first nonce K back to the cloud-based security processing system 14 to confirm receipt of the first seed S and first nonce K. When the security processing system 14 receives the confirmation transmission (arrow "B") from the security monitoring device 10, the security processing system 14 can check that the seed and nonce in the confirmation transmission matches the first seed S and first nonce K that the security processing system 14 originally transmitted to the security monitoring device 10. If there is a match, the security processing system 14 can be sure that the security monitoring device 10 will be using the correct seed and nonce to secure subsequent transmission of keep-alive messages when the wireless connection between the security monitoring device 10 and the security processing system is not being secured by TLS.

In the illustrated implementation, the first seed S is 32 bits and the first nonce K is 256 bits. Of course, the number of bits in the first seed S and the first nonce K can vary considerably. However, in most instances, the number of bits in the first nonce K will be some integer multiple of the number of bits in the first seed. For example, in the illustrated implementation, the size of the first nonce K (at 256 bits) is 8 times the size of the first seed (at 32 bits). In some implementations, for example, the first nonce K may be 10 or more times the size of the first seed S.

In a typical implementation, the cloud-based security processing system 14 may be configured to communicate with multiple different security monitoring devices, each of which may be at a different physical location. In order to help determine which specific one of the security monitoring devices each keep-alive message originated at, the cloud-based security processing system 14 generally stores the first seed S and the first nonce K in its memory (e.g., 242) in logical association with a unique identifier (DeviceID) for each respective one of the security monitoring devices, to which it is connected.

As mentioned above, over time, the security monitoring device 10 toggles between active mode and sleep mode. In a typical implementation, a new, unique (and possibly random) seed and nonce are generated every time the security monitoring device 10 reenters active mode. Then, that new seed and nonce are used to secure transmission of keep-alive messages during the immediately subsequent period of time when the security monitoring device reenters sleep mode and the wireless connection is not protected by TLS.

According to the illustrated implementation, after the first seed S and the first nonce K have been generated and shared between the cloud-based security processing system 14 and the security monitoring device 10, and the security monitoring device 10 enters sleep mode, the security monitoring device 10 periodically transmits a keep-alive message 344 to the cloud-based security processing system 14. The keep-alive message 344, in a typical implementation, is or includes a payload that is generated using a process known to both the security monitoring device 10 and the cloud-based security processing system 14 with the first seed S and the first nonce K as inputs to the process.

In a particular implementation of the payload-generating process, which is represented in the illustrated implementation, the security monitoring device 10 generates a first series of pseudo-random bit sequences ($S_i$, $S_{i+1}$, $S_{i+2}$, $S_{i+3}$ ... ) with a pseudo-random number generator, using the first seed S to initialize the pseudo-random number generator. In a typical implementation, the number of iterations (or sequences) in the first series of pseudo-random bit sequences depends on the size of the first nonce (i.e., the number of bits in the first nonce), Size (K), divided by the size of each bit block that the first nonce gets split up into, Size (Block). So, in a typical implementation, Number of iterations (sequences)=Size (K)/Size (Block).

Generally speaking, pseudo-randomness causes the resulting series of bit sequences to appear to be random even though it is not random. Pseudo-random sequences tend to exhibit statistical randomness while being generated by an entirely deterministic causal process.

Generally speaking, each pseudo-random bit sequence in the series will be the same size (32 bits in the illustrated example) as the first seed S that initialized the pseudo-random generator.

Additionally, according to the illustrated implementation, the security monitoring device 10 divides the first nonce K into multiple bit blocks ($K_0$, $K_1$, $K_2$, $K_3$ ... ). The number of bit blocks that the first nonce is divided into can, of course, vary. However, in a typical implementation, such as the one represented in the illustrated implementation, the number of bit blocks will depend on how many times larger the first nonce K is than the first seed S. In the illustrated example, the first nonce K (256 bits) is 8 times larger than the first seed (32 bits). Therefore, the number of bit blocks ($K_0$, $K_1$, $K_2$, $K_3$ . . . ) produced in the illustrated example would be 8, and each bit block (e.g., bit block $K_0$) is the same size (32 bits) as a corresponding one of the pseudo-random bit sequences ($S_i$, $S_{i+1}$, $S_{i+2}$, $S_{i+3}$ . . . ).

Notably, in a typical implementation, the indicated process produces the same number of bit blocks ($K_0$, $K_1$, $K_2$, $K_3$ . . . ) as pseudo-random bit sequences ($S_i$, $S_{i+1}$, $S_{i+2}$, $S_{i+3}$ . . . ). In the illustrated example, that number would be 8.

Next, in the illustrated example, the security monitoring device 10 generates a first payload by logically combining each one of the bit blocks ($K_0$, $K_1$, $K_2$, $K_3$ . . . ) with a respective one of the bit sequences ($S_i$, $S_{i+1}$, $S_{i+2}$, $S_{i+3}$ . . . ) in the first series in a bitwise manner. Thus, bit block $K_0$ is logically combined with bit sequence $S_i$, bit block $K_1$ is logically combined with bit sequence $S_{i+1}$, bit block $K_2$ is logically combined with bit sequence $S_{i+2}$, and bit block $K_3$ is logically combined with bit sequence $S_{i+3}$.

The specific way in which the bit blocks are logically combined with the bit sequences can vary. In the illustrated implementation, the logical combinations are exclusive OR combinations. Generally speaking, exclusive OR is a logical operator that outputs true only when inputs differ (one is true, the other is false). The following truth table shows one column for each input variable (A and B), and one column for all of the possible outputs of the logical exclusive OR (XOR) operation. In the following table, a 1 corresponds to true and a 0 corresponds to false.

XOR Truth Table

| Input | | Output |
|---|---|---|
| A | B | |
| 0 | 0 | 0 |
| 0 | 1 | 1 |
| 1 | 0 | 1 |
| 1 | 1 | 0 |

Of course, other logical operators, such as AND, OR, NOT, NAND, NOR, XNOR, etc. or combinations thereof, may be used instead or in addition to the exclusive OR (XOR) logical operator.

Next, the security monitoring device 10 transmits (see arrow "C") a first keep-alive message 344 to the security processing system 14. According to the illustrated example, the security monitoring device 10 transmits the first keep-alive message (and typically any subsequent keep-alive messages) using a wireless chip (e.g., Wi-Fi module 232) in the security monitoring device 10. In a typical implementation, the first keep-alive message is or includes the first payload. Moreover, as mentioned elsewhere, the first keep-alive message and, indeed, all of the keep-alive messages are typically transmitted when the security monitoring device 10 is in sleep mode and when the wireless connection to the cloud-based security processing system 14 is not secured by TLS.

According to the illustrated implementation, the cloud-based security processing system 14 receives the transmitted keep-alive message, and confirms that the first keep-alive message originated at the security monitoring device 10. In a typical implementation, the cloud-based security processing system 14 is able to do this because it knows the first seed S, the first nonce K and the process by which the payload of the keep-alive message 344 was generated. Generally speaking, the cloud-based security processing system uses these pieces of information to validate the payload of the keep-alive message 344.

In one particular example, of the cloud-based security processing system 14 validating the payload of the keep-alive message 344, the security processing system 14 generates a series of test bit sequences using the same pseudo-random number generating algorithm used by the security monitoring device 10 to produce the first series of bit sequences ($S_i$, $S_{i+1}$, $S_{i+2}$, $S_{i+3}$ . . . ). Moreover, like the security monitoring device 10, the security processing system 14 uses the first seed being to initialize the pseudo-random number generator in this regard. The security processing system 14 also divides the random nonce into multiple test bit blocks. The security processing system 14 generates a test payload by logically combining (e.g., by exclusive OR) each one of the test bit blocks with a respective one of the test bit sequences in the series in a bitwise manner. Finally, the security processing system 14 compares the test payload with the first payload received in the first keep-alive message. If there is a match, then the security processing system 14 concludes that the security monitoring device 10 has been sleeping and that the keep-alive message originated at that security monitoring device 10.

In a typical implementation, if, after sending the first keep-alive message 344, the security monitoring device 10 remains in sleep mode, after a predetermined amount of time (e.g., between 1 and 5 seconds), the security monitoring device 10 generates and sends a second keep-alive message that is different (i.e., it has at least a different payload) than the first.

In some implementations, to do this, the security monitoring device 10 generates a second series of bit sequences using the pseudo-random number generating algorithm with a last bit sequence (e.g., $S_{i+3}$) from the previous (e.g., first) series as a seed to initialize the pseudo-random number generating algorithm to generate the second series of bit sequences. The security monitoring device 10 then generates a second payload by logically combining (e.g., exclusive OR) each one of the bit blocks ($K_0$, $K_1$, $K_2$, $K_3$ . . . ) with a respective one of the bit sequences in the second series of bit sequences in a bitwise manner. The security monitoring device then transmits a second keep-alive message that is or includes the second payload to the security processing system 14 via the unsecured wireless connection.

The security processing system 14 receives and processes the second (and any subsequent) keep-alive messages in much the same way that it received and processed the first keep-alive message.

Generally speaking, the security monitoring device 10 continues to send keep-alive messages, each one being different than the prior one, to security processing system 14 periodically for as long as the security monitoring device 10 remains in sleep mode. Additionally, the pseudo-random number generating algorithm helps ensure a predictable, yet seemingly random, payload mutation over time.

As mentioned elsewhere herein, if the security monitoring device 10 is reawakened (i.e., reenters active mode) after being in sleep mode, then the system 100 generates a new seed and a new nonce to share between the security monitoring device and the security processing system over the wireless connection. The new seed and the new nonce typically are different than the first seed and the first nonce and are utilized in much the same way as the first seed and first nonce to help secure transmission of subsequent keep-alive messages when the security monitoring device 10 is in sleep mode and the wireless connection to the security processing system is not secured (by TLS).

Figure 10:
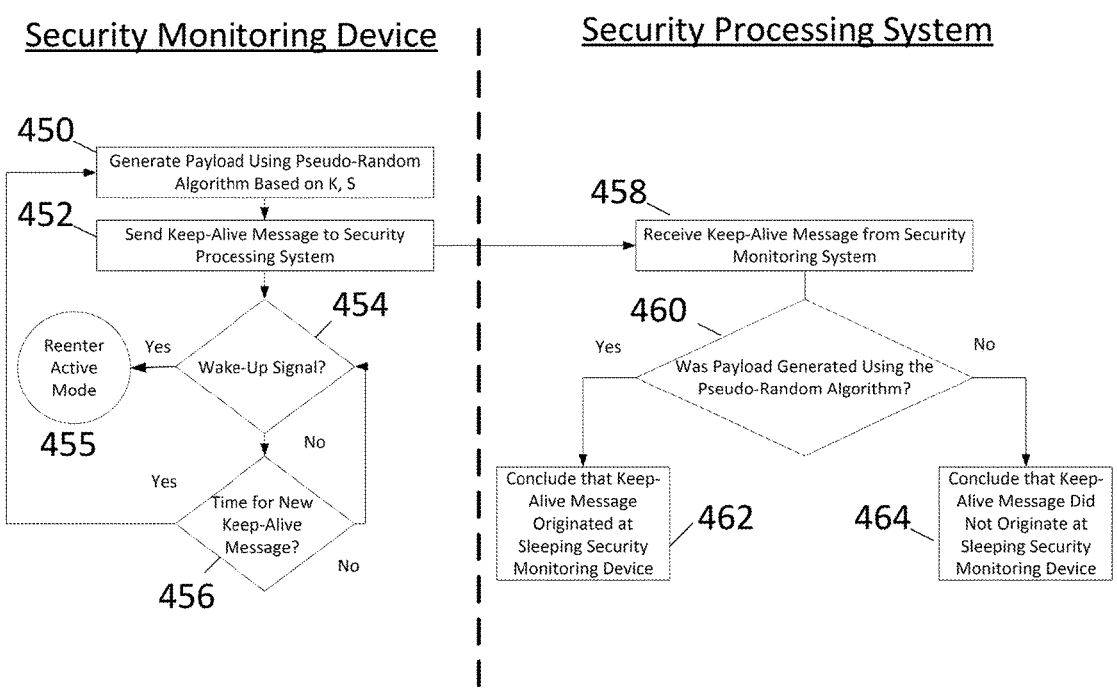
FIG. 10 is a flowchart showing exemplary interactions between the security monitoring device and the cloud-based security processing system of the system in FIG. 7 when the security monitoring device is in sleep mode.

FIG. 10 is a flowchart showing exemplary interactions between the security monitoring device 10 and the cloud-based security processing system 14 of system 100 when the security monitoring device 10 is in sleep mode.

According to the illustrated flowchart, the security monitoring device 10 (at 450) generates a first payload for sending as or with a keep-alive message.

Next, the security monitoring device 10 (at 452) sends or transmits the keep-alive message to the security processing system 14.

If (at 454) the security monitoring device 10 receives a wake-up signal (e.g., from its motion sensor sensing motion in the monitored physical location, etc.), the security monitoring device 10 wakes up and reenters active mode (at 455). Typically, in active mode, the security monitoring device 10 is actively communicating with the cloud-based security processing system (e.g., by sending images or video, etc.) via TLS, but does not send keep-alive messages.

If (at 454) the security monitoring device 10 does not receive a wake-up signal, and it is time (456) for a new keep-alive message (with a new, different payload) to be transmitted, the process returns to step 450 and generates a new payload (with a new pseudo-random payload). In a typical implementation, the security monitoring device 10 includes a timer to indicate when a new keep-alive message should be sent.

According to the illustrated flowchart, the keep-alive message transmitted (at 452) by the security monitoring device 10 is received (at 458) by the cloud-based security processing system 14.

The cloud-based security processing system 14 then determines (at 460) whether the payload of the keep-alive message was generated using the appropriate pseudo-random algorithm.

If the cloud-based security processing system 14 determines (at 460) that the payload was generated using the appropriate pseudo-random algorithm, the cloud-based security-processing system 14 concludes (at 462) that the keep-alive message originated at a sleeping or inactive security monitoring device (e.g., 10). If, on the other hand, the cloud-based security processing system 14 determines (at 460) that the payload was not generated using the appropriate pseudo-random algorithm, the cloud-based security-processing system 14 concludes (at 464) that the keep-alive message did not originate at a sleeping or inactive security monitoring device (e.g., 10). At that point, the cloud-based security processing system 14 may, for example, discontinue using that wireless connection and the security monitoring device 10 may need to reestablish a new wireless connection with the cloud-based security processing system, 14, e.g., when it reenters active mode.

A number of embodiments of the invention have been described. Nevertheless, it will be understood that various modifications may be made without departing from the spirit and scope of the invention.

For example, the systems and techniques disclosed herein can be applied to virtually any kind of security monitoring system that is able to implement the functionalities disclosed herein.

The security monitoring device 10 can be configured to monitor, in real time, any one or more of a plurality of different security-related characteristics associated with the associated monitored physical space. In this regard, in a typical implementation, the security monitoring device 10 may have multiple of sensors or detectors that include, for example, one or more of the following: a video camera (that optionally includes night vision capability), a microphone, a motion detector, a temperature sensor, a humidity sensor, an air quality sensor, a smoke detector, an accelerometer, etc. In various implementations, the security monitoring device may be configured to toggle between sleep mode and active mode based, in part, on input (or lack of input) from one or more of these, or other, sensors. For example, in some implementations, the device may toggle into active mode in response to a sound picked up by a microphone on the device.

The computer-based processing system 14 also has a communications module that facilitates communicating with other system components, including the security monitoring device 10, any computer-based user interface devices (e.g., smartphone 24) and/or other system components not specifically shown in FIG. 7.

The mobile device(s) can be virtually any kind of computer-based device that a person might use to access information over a network, such as the Internet 16. In the illustrated example, the mobile device is a smartphone 24. However, different mobile device can include tablets, cell phones, laptop computers and/or desktop computers, or any combination thereof, etc. In a typical implementation, each mobile device has a computer-based processor, a computer-based memory device, an operating system, and application software (e.g., an "app") configured to interact with the operating system to perform or facilitate one or more of the functionalities disclosed herein. Moreover, in a typical implementation, each mobile device includes a communications module that facilitates communicating with other system components, including the security monitoring device 10, the security processing system 14 and/or other system components not specifically shown in FIG. 7.

In the illustrated example, there is only one mobile device 24 shown and that mobile device belongs to a person 26 who lives in the home 12 where the monitored physical space is located. Of course, in various implementations, several people will live in a home or work in an environment where a monitored physical space is located and each of those people may have a mobile device. In general, in the illustrated example, if the security monitoring device 10 senses (or detects) data that suggests that an unsafe or otherwise undesirable circumstance exists (or has come into being) at the monitored physical space, then the system 100 notifies the person 26 at his or her mobile device 24.

In various implementations, one or more of the devices disclosed herein may be configured to communicate wirelessly over a wireless communication network via one or more wireless communication protocols including, but not limited to, cellular communication, ZigBee, REDLINK™, Bluetooth, Wi-Fi, IrDA, dedicated short range communication (DSRC), EnOcean, and/or any other suitable common or proprietary wireless protocol.

In some implementations, certain functionalities described herein may be provided by a downloadable software application (i.e., an app). The app may, for example, implement or facilitate one or more (or all) of the functionalities described herein as taking place at or in association with a website.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, some of the concepts disclosed herein can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

Various functionalities associated with the system(s) disclosed herein can be accessed from virtually any kind of electronic computer device, including, for example, cell phones and tablet.

This application describes secure pairing of devices as well as secure keep-alive concepts. These concepts and similar concepts, or aspects thereof, can of course be incorporated together (e.g., in one system or device) or not and portions of each can be combined together in piecemeal fashion.

Other implementations are within the scope of the claims.

What is claimed is:

1. A method comprising:
   sending information that includes identification information for a mobile hotspot device from the mobile hotspot device to a cloud-based computer processing system;
   sending identification information for a security monitoring device from the security monitoring device to a software application on a user's mobile device;
   prompting a user, via the software application on the user's mobile device, to provide the identification information for the mobile hotspot device to the user's mobile device;
   sending a pairing request from the software application on the user's mobile device to the cloud-based computer processing system, wherein the pairing request includes the identification information for the mobile hotspot device that was provided by the user and the identification information for the security monitoring device;
   sending a response to the pairing request from the cloud-based computer processing system to the software application on the user's mobile device; and
   using information in the response to the pairing request to establish a wireless connection between the mobile hotspot device and the security monitoring device.

2. The method of claim 1, wherein the mobile hotspot device is equipped with Wi-Fi and cellular communication capabilities, and
   wherein the security monitoring device is equipped with Wi-Fi communication capabilities, but not cellular communication capabilities.

3. The method of claim 2, wherein after the wireless connection is established between the mobile hotspot device and the security monitoring device, the security monitoring device communicates with the cloud-based computer processing system and/or the software application on the user's mobile device through the mobile hotspot device.

4. The method of claim 3, further comprising, after the wireless connection is established between the mobile hotspot device and the security monitoring device:
   capturing an image or video clip with a camera on the security monitoring device; and transmitting the image or video clip captured by the security monitoring device from the security monitoring device over the wireless connection to the mobile hotspot device and from the mobile hotspot device, directly or indirectly, to the software application on the user's mobile device, wherein the software application is configured to enable the user to view the captured image or video clip on a screen of the user's mobile device.

5. The method of claim 1, wherein the information that includes the identifier of the mobile hotspot device comprises one or more of: a serial number for the mobile hotspot device, a service set identifier (SSID), a registry key (REG_KEY), and a nonce.

6. The method of claim 5, wherein the information that includes the identifier of the mobile hotspot device is sent utilizing transport layer security (TLS) or secure sockets layer (SSL).

7. The method of claim 5, further comprising:
checking, in a database at the cloud-based computer processing system, whether the mobile hotspot device is already associated with a security monitoring device other than the security monitoring device associated with the identification information received from the security monitoring device.

8. The method of claim 5, further comprising:
creating the response to the pairing request at the cloud-based computer-processing system, wherein the response to the pairing request comprises an encrypted blob based on the SSID and the nonce.

9. The method of claim 8, wherein the pairing request and the response to the pairing request are sent utilizing transport layer security (TLS) or secure sockets layer (SSL).

10. The method of claim 8, further comprising:
encrypting the blob with a public key that matches the identification information for the security monitoring device that was sent from the software application on the user's mobile device to the cloud-based computer processing system.

11. The method of claim 10, wherein the identification information for the security monitoring device comprises a universally unique identifier (UUID).

12. The method of claim 10, further comprising:
sending the encrypted blob and the registry key for the mobile hotspot device that was provided by the user to the security monitoring device.

13. The method of claim 12, wherein the encrypted blob and the registry key is sent from the user's mobile device to the security monitoring device over a Bluetooth® connection.

14. The method of claim 12, further comprising:
receiving the registry key provided by the user in response to the prompting by the user's mobile device to provide the identifier of the mobile hotspot device.

15. The method of claim 12, further comprising:
decoding the encrypted blob at the security monitoring device using a private key, from which the public key was derived.

16. The method of claim 12, further comprising:
generating a pre-shared key (PSK) at the security monitoring device and using the PSK to connect, via a Wi-Fi connection, to the mobile hotspot device.

17. The method of claim 16, wherein the PSK is based on the encrypted blob and the registry key.

18. The method of claim 1, wherein the security monitoring device comprises:
a housing;
a camera supported by the housing, wherein the camera is operable to obtain images or video clips of a monitored physical location; and
one or more computer chips supported by the housing and configured to support:
wireless communications based on a wireless protocol for exchanging data over short distances from the security monitoring device to fixed or mobile devices; and
wireless communications based on Wi-Fi.

19. The method of claim 1, further comprising:
physically attaching the security monitoring device to the mobile hotspot device.

20. The method of claim 1, further comprising:
creating a logical association between the security monitoring device and the mobile hotspot device in a memory storage device at the cloud based computer processing system.

* * * * *